US011703704B2

(12) United States Patent
Ishikawa et al.

(10) Patent No.: US 11,703,704 B2
(45) Date of Patent: Jul. 18, 2023

(54) DISPLAY DEVICE

(71) Applicant: Japan Display Inc., Tokyo (JP)

(72) Inventors: Tomokazu Ishikawa, Tokyo (JP);
Masateru Morimoto, Tokyo (JP);
Masaru Nakakomi, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/863,438

(22) Filed: Jul. 13, 2022

(65) Prior Publication Data
US 2023/0019616 A1 Jan. 19, 2023

(30) Foreign Application Priority Data

Jul. 15, 2021 (JP) .................. 2021-117065

(51) Int. Cl.
*G02F 1/1333* (2006.01)
*G02F 1/1339* (2006.01)
*G06V 40/13* (2022.01)
*G02F 1/1335* (2006.01)
*G02F 1/1343* (2006.01)
*G02F 1/133* (2006.01)
*G02F 1/1337* (2006.01)

(52) U.S. Cl.
CPC ...... *G02F 1/13338* (2013.01); *G02F 1/13318* (2013.01); *G02F 1/13394* (2013.01); *G02F 1/133512* (2013.01); *G02F 1/134309* (2013.01); *G06V 40/1318* (2022.01); *G02F 1/133707* (2013.01)

(58) Field of Classification Search
CPC ......... G02F 1/134309; G02F 1/133707; G02F 1/13394; G02F 1/13338; G02F 1/13318
See application file for complete search history.

(56) References Cited

U.S. PATENT DOCUMENTS

| | | | |
|---|---|---|---|
| 10,914,977 B1* | 2/2021 | Hsu ..................... | G02F 1/13338 |
| 2009/0180043 A1* | 7/2009 | Rho .................... | G02F 1/13338 349/12 |
| 2015/0277176 A1* | 10/2015 | Seo ..................... | G02F 1/13394 257/72 |
| 2016/0246135 A1* | 8/2016 | Tae .................... | G02F 1/133707 |
| 2017/0102593 A1* | 4/2017 | Sakurai ............... | G02F 1/13306 |
| 2017/0139282 A1* | 5/2017 | Wu .................... | G02F 1/134309 |
| 2018/0196297 A1* | 7/2018 | Morimoto ......... | G02F 1/136286 |
| 2019/0278144 A1* | 9/2019 | Hosokawa ............ | G06F 3/0448 |
| 2020/0265207 A1 | 8/2020 | Chu et al. | |
| 2021/0110131 A1* | 4/2021 | Lin ................... | H01L 27/14623 |

* cited by examiner

*Primary Examiner* — Jessica M Merlin
(74) *Attorney, Agent, or Firm* — Xsensus LLP

(57) ABSTRACT

In a plan view, a spacer member is arranged at a position overlapping with a first line portion of a second pixel electrode. The second pixel electrode has a second connecting portion that connects the first line portion and the second line portion arranged next to the first line portion. The second connecting portion of the pixel electrode is arranged between a region where the first line portion of the second pixel electrode overlaps with the spacer member and one end portion of the first line portion of the second pixel electrode.

9 Claims, 15 Drawing Sheets

DISPLAY DEVICE

CROSS-REFERENCE TO RELATED APPLICATION

The present application claims priority from Japanese Patent Application No. 2021-117065 filed on Jul. 15, 2021, the content of which is hereby incorporated by reference into this application.

TECHNICAL FIELD OF THE INVENTION

The present invention relates to a technique of a display device, and relates to a technique effectively applied to a display device in which an optical sensor is built.

BACKGROUND OF THE INVENTION

There is a technique for receiving fingerprint data by building an optical sensor in a display device (see, for example, US Patent Application Publication No. 2020/0265207).

SUMMARY OF THE INVENTION

The inventors of the present application have studied, as part of improvement in performance of the display device, a technique for building the optical sensor in the display device. In order to improve identification reliability of input information incident on the optical sensor as an optical signal, it is necessary to reduce unintended light (in other words, noise) incident on a light receiving portion of the optical sensor.

An object of the present invention is to provide a technique for improving the performance of the display device.

A display device, which is one embodiment of the present invention, includes: a first substrate; a second substrate opposing the first substrate; a liquid crystal layer arranged between the first substrate and the second substrate; an optical sensor arranged between the first substrate and the liquid crystal layer; a plurality of pixels composed of a first sub-pixel, a second sub-pixel arranged next to one end of the first sub-substrate in a first direction, a third sub-pixel arranged next to the other end of the first sub-pixel in the first direction; a plurality of pixel electrodes arranged between the liquid crystal layer and the first substrate; a first light-shielding film formed between the liquid crystal layer and the second substrate and formed in a matrix so as to partition each of the first sub-pixel, the second sub-pixel, and the third sub-pixel; and a first spacer member arranged between the first substrate and the second substrate and mainlining a thickness of the liquid crystal layer. Each of the first sub-pixel, the second sub-pixel, and the third sub-pixel includes: a visible light transmitting region that transmits visible light via a display opening formed in the first light-shielding film; and a light-shielding region arranged next to the visible light transmitting region in a second direction intersecting with the first direction, and covered with the first light-shielding film. Each of the plurality of pixel electrodes includes: a first line portion, a second line portion, and a third portion that extend in the second direction and are arranged so as to separate from one another at one end portions thereof; and a first connecting portion formed so as to connect the respective other end portions of the first line portion, the second line portion, and the third line portion. The plurality of pixel electrodes includes a first pixel electrode arranged on the first sub-pixel, a second pixel electrode arranged on the second sub-pixel, and a third pixel electrode arranged on the third sub-pixel. The first spacer member is arranged at a position overlapping with the first line portion of the second pixel electrode in a plan view. The second pixel electrode further has a second connecting portion that connects the first line portion and a second line portion arranged next to the first line portion. The second connecting portion of the second pixel electrode is arranged between a region where the first line portion of the second pixel electrode overlaps with the first spacer member and the one end portion of the first line portion of the second pixel electrode.

DESCRIPTION OF THE PREFERRED EMBODIMENTS

Figure 1:
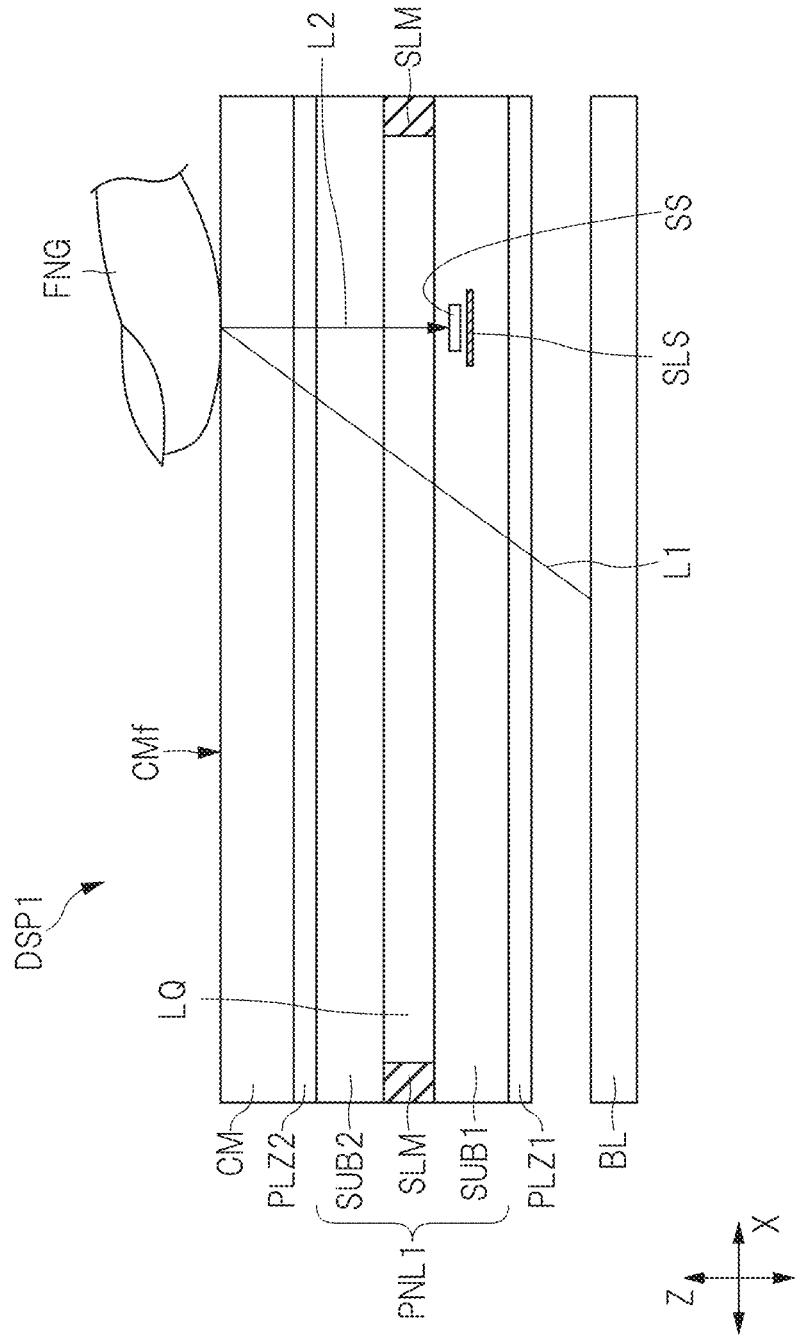
FIG. 1 is an explanatory diagram schematically showing a configuration example of a display device according to an embodiment.

Hereinafter, embodiments of the present invention will be described with reference to the drawings. Note that the disclosure is mere an example, and it is a matter of course that any alteration that is easily made by a person skilled in the art while keeping a gist of the present invention is included in the present invention. In addition, the drawings schematically illustrate a width, a thickness, a shape and the like of each portion as compared to actual aspects in order to make the description clearer, but the drawings are mere examples and do not limit the interpretation of the present invention. In addition, the same reference characters are applied to the same elements as those described in relation to the foregoing drawings in the present specification and the respective drawings, and detailed descriptions thereof will be appropriately omitted in some cases.

In the following description, the drawings may respectively describe the X-axis, Y-axis, and Z-axis that are orthogonal to one another. In the following description, a direction along the X-axis is referred to as an X direction, a direction along the Y-axis is referred to as a Y direction, and a direction along the Z-axis is referred to as a Z direction. In the following description, a plane defined by the X-axis and the Y-axis will be referred to as an X-Y plane, and a plane defined by the X-axis and the Z-axis will be referred to as an X-Z plane. In the following description, the term "planar view" or "perspective plan view" means viewing from the normal direction with respect to the X-Y plane. Further, in the following description, when a thickness direction of a member or device such as "a thickness direction of a display device" is referred to, it means a thickness in the Z direction in principle. However, this does not apply if it is stated that it should be interpreted as a particularly different meaning.

In the following description, the terms "red light", "green light", and "green light" may be used for explanation. These terms mean wavelength ranges of light. Red light means light of 620 to 750 nm [nanometers]. Green light means light of 495 to 570 nm. Blue light means light of 450 to 495 nm. The terms "red filter", "green filter", and "blue filter" each mean an optical filter that selectively transmits light in a specific wavelength range. For example, the red filter has an optical property of: transmitting visible light in a wavelength range of 620 to 750 nm; and shielding visible light in the other wavelength range. Further, the term "infrared cut filter" or "infrared resist" is an optical member having optical characteristics that selectively shield light in an infrared wavelength range (about 780 to 1000 nm).

First Embodiment

<Outline of Display Device in which Optical Sense is Build>

FIG. 1 is an explanatory diagram schematically showing a configuration example of a display device according to the present embodiment. A display device DSP1 includes a display panel PNL1, a cover member CM, a polarizing plate PLZ1, a polarizing plate PLZ2, and a lighting device BL.

The display panel PNL1 is a liquid crystal display panel that displays images and videos by controlling an orientation of liquid crystal. The display panel PNL1 includes an array substrate SUB1, an opposed substrate SUB2 opposing the array substrate SUB1, a sealing material SLM, and a liquid crystal layer LQ. The liquid crystal layer LQ is enclosed between the array substrate SUB1 and the opposed substrate SUB2 by the sealing material SLM. The display panel PNL1 of the present embodiment is a transmissive type that displays an image by selectively transmitting light from a back surface side of the array substrate SUB1 to a front surface side of the opposed substrate SUB2.

The array substrate SUB1 includes a sensor (optical sensor) SS and a sensor light-shielding layer SLS. The sensor SS is located between the liquid crystal layer LQ and the sensor light-shielding layer SLS. Incidentally, although not shown in FIG. 1, a collimating layer having a function as a collimator that shields external light incident on the sensor SS may be further located in any one or both of a region between the sensor SS and the liquid crystal layer LQ and a region of the opposed substrate SUB2.

The sealing material SLM adheres the array substrate SUB1 and the opposed substrate SUB2. A spacer member (not shown) is arranged between the array substrate SUB1 and the opposed substrate SUB2, and the spacer member maintains a gap (cell gap) between the array substrate SUB1 and the opposed substrate SUB2. The liquid crystal layer LQ is filled in this cell gap.

The cover member CM is provided on a front surface side of the display panel PNL1. For example, a glass substrate or a resin substrate can be used as the cover member CM. The cover member CM has a front surface CMf with which an object detected by the sensor SS contacts. In an example of FIG. 1, a finger FNG, which is an example of the object, contacts with the front surface CMf. The polarizing plate PLZ2 is provided between the display panel PNL1 and the cover member CM.

The lighting device BL is provided on a back surface side of the display panel PNL1, and irradiates the array substrate SUB1 with light L1. The lighting device BL is, for example, a side edge type backlight, and includes a plate-shaped light guide body and a plurality of light sources that selectively transmit light to a side surface of the light guide body. The polarizing plate PLZ1 is provided between the display panel PNL1 and the lighting device BL.

Reflected light L2, which is reflected by the finger FNG, in the light L1 is incident on the sensor SS. That is, until being incident on the sensor SS, the reflected light L2 reflected by the finger FNG transmits the cover member CM, the polarizing plate PLZ2, the opposed substrate SUB2, the liquid crystal layer LQ, and a portion located on a front-surface side of the array substrate SUB1 from the sensor SS.

The sensor SS outputs a detection signal according to the incident light. As will be described later, the display panel PNL1 is provided with the plurality of sensors SS, and can detect unevenness (for example, fingerprints) of the finger FNG if being based on the detection signal outputted by those sensors SS.

It is desirable that the sensor SS detect the incident light parallel to a normal direction of the front surface CMf in order to obtain the more accurate detection signal. When the above-mentioned collimating layer is arranged on at least one of the array substrate SUB1 and the opposed substrate SUB2, the collimating layer arranged on at least one of the array substrate SUB1 and the opposed substrate SUB2 can be caused to function as a collimator that parallelizes the reflected light L2 incident on the sensor SS.

As described above, by mounting the sensor SS on the display device DSP1, a function as a fingerprint sensor can be added to the display device DSP1. Further, the sensor SS can also be used in a use application of detecting information about a living body based on the reflected light L2 reflected inside the finger FNG, in addition to or instead of the detection of the fingerprint. The information about the living body is, for example, a blood vessel image such as a vein, a pulse, a pulse wave, or the like.

Figure 2:
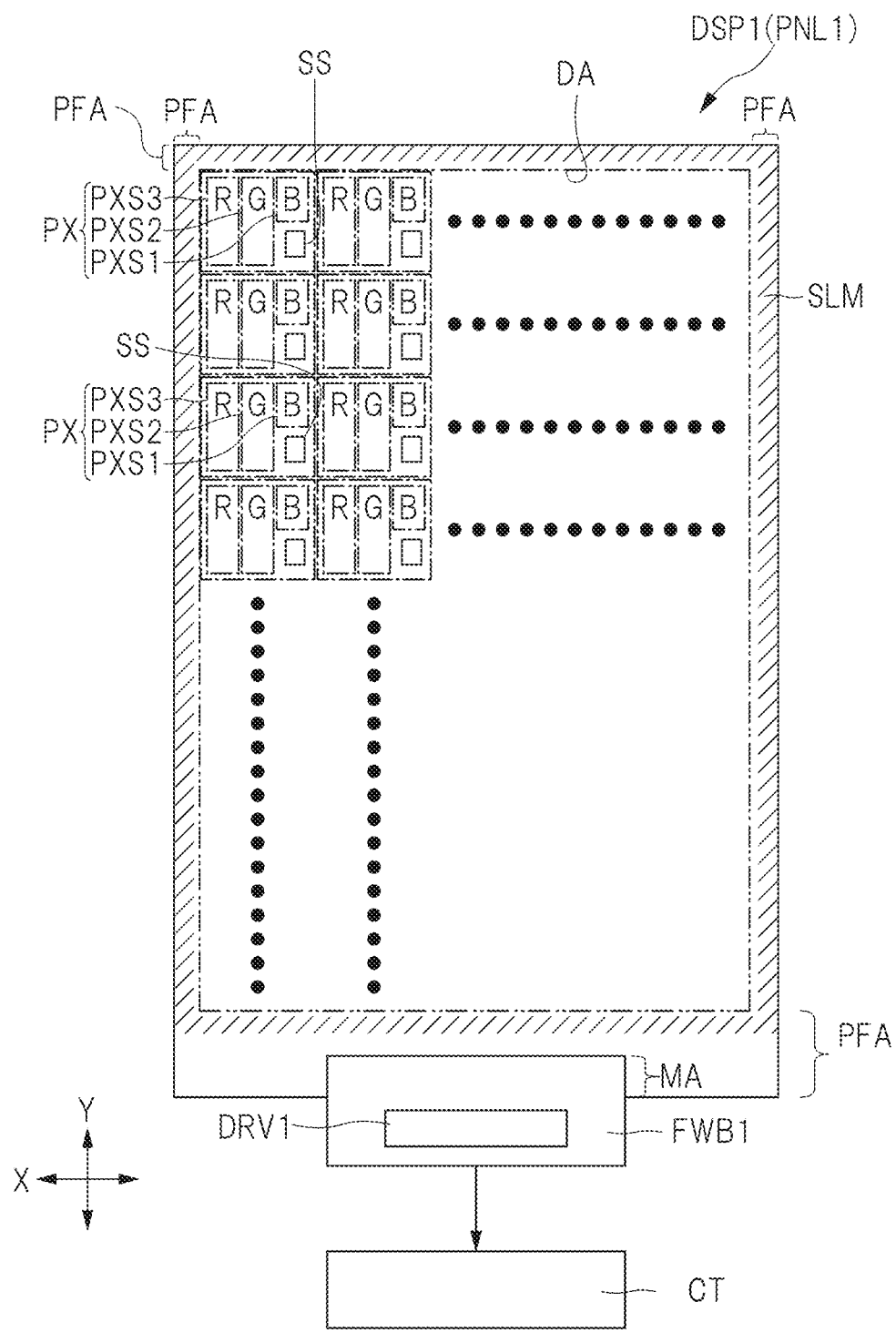
FIG. 2 is a plan view showing the configuration example of the display device shown in FIG. 1 in a plan view.

FIG. 2 is a plan view showing a configuration example of the display device shown in FIG. 1 in a plan view. In FIG. 2, a boundary between a display area DA and a peripheral area PFA is shown by a dash-double-dot line. In FIG. 2, a pixel PX and sub-pixels PXS1, PXS2, PXS3 are shown by dash-single-dot lines. In FIG. 2, a region where the sealing material SLM is arranged is shown by hatching.

The display device DSP1 includes the above-mentioned display panel PNL1, and a wiring board FWB1 mounted on the display panel PNL1. The display panel PNL1 has a display area DA for displaying an image, and a peripheral area PFA surrounding the display area DA. The peripheral area PFA is, for example, a non-display area.

The array substrate SUB1 has a mounting area MA that does not overlap with the opposed substrate SUB2. The sealing material SLM is included in the peripheral area PFA. The display area DA is located inside the sealing material SLM. The display panel PNL1 includes a plurality of pixels PX arranged in a matrix in an X direction and a Y direction in the display area DA.

The pixel PX includes a sub-pixel (first sub-pixel) PXS1 that selectively transmits blue (B) light, a sub-pixel (second sub-pixel) PXS2 that selectively transmits green (G) light, and a sub-pixel (third sub-pixel) PXS3 that selectively transmits red (R) light. Incidentally, the pixel PX may include sub-pixels that selectively transmit light other than red, green, and blue light.

A layout of the sub-pixel, which each of the plurality of pixels PX has, can be expressed as follows. Each of the plurality of pixels PX includes the sub-pixel (first sub-pixel) PXS1, the sub-pixel (second sub-pixel) PXS2 arranged next to one end of the sub-pixel PXS1 in the X direction (first direction), and the sub-pixel (third sub-pixel) PXS3 arranged next to the other end of the sub-pixel PXS1 in the X direction (first direction).

Figure 9:
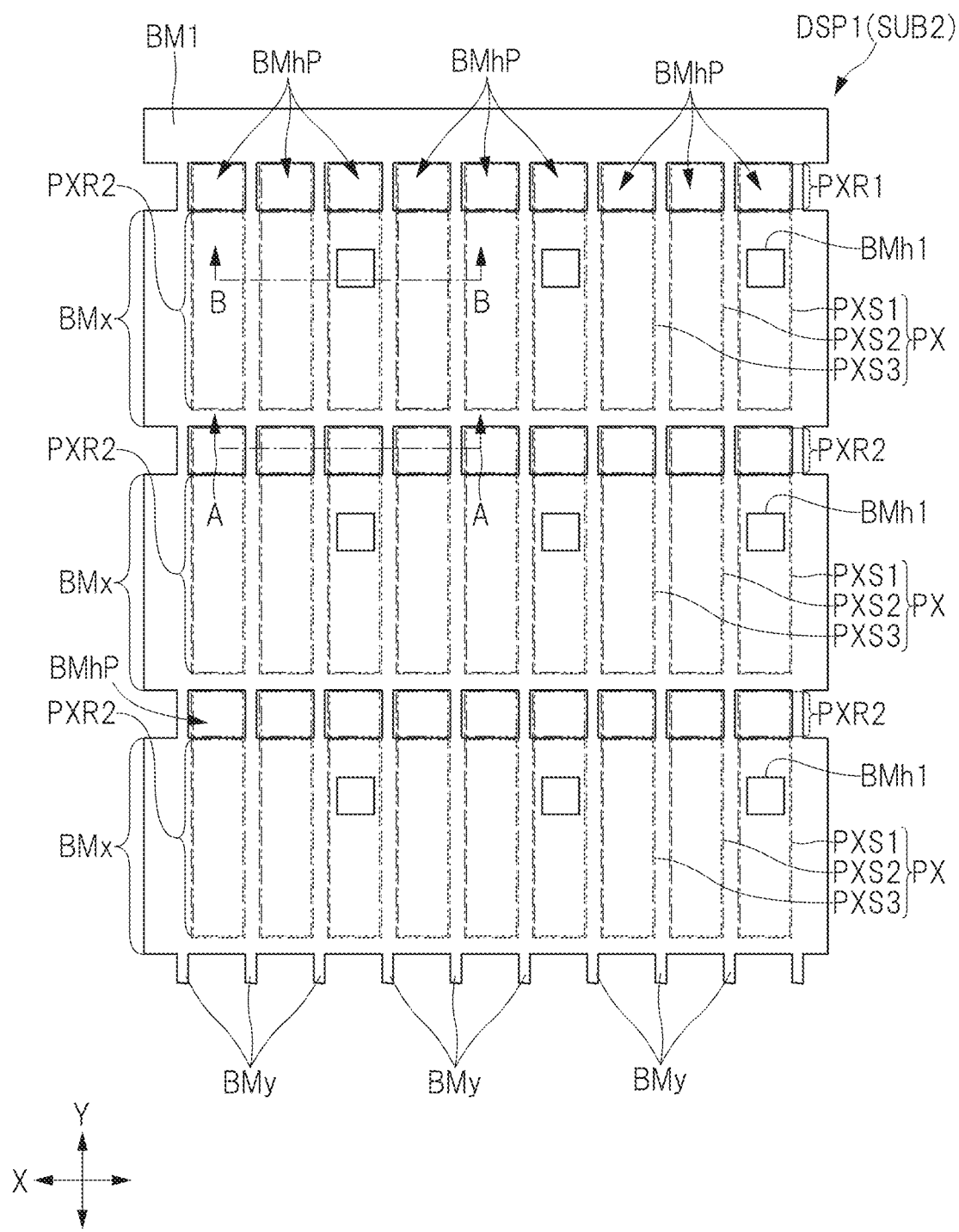
FIG. 9 is an enlarged plan view showing an example of a planar shape of a light-shielding film shown in FIG. 8.

As shown in FIG. 9 described later, each of the sub-pixels PXS1, PXS2, PXS3 has a visible light transmission region through which visible light passes via an opening (display opening) BMhP formed in the light-shielding film BM. Further, each of the sub-pixels PXS1, PXS2, PXS3 is arranged next to the visible light transmission region PXR1 in the Y direction, and has a light-shielding region PXR2 covered with the light-shielding film BM.

In an example shown in FIG. 2, one sensor SS is arranged for each of the plurality of pixels PX. In the entire display area DA, the plurality of sensors SS are arranged in a matrix in the X direction and the Y direction. However, as a modification example, the sensor(s) SS may be arranged for a part of the plurality of pixels PX. For example, the sensors SS may be arranged at a ratio of one to the plurality of pixels PX adjacent to each other. Further, for example, one or a plurality of sensors SS may be arranged for the pixel PX in one part of the display area DA, and the sensor SS may not be arranged for the pixel PX in the other part.

A wiring board FWB1 is, for example, a flexible circuit board, and is connected to a terminal portion provided in the mounting area MA. Further, the wiring board FWB1 includes a driver DRV1 that drives the display panel PNL1. Incidentally, the driver DRV1 may be mounted in another area (position) such as the mounting area MA on the array substrate SUB1. For example, the driver DRV1 includes an IC that controls a display operation by each pixel PX, and an IC that controls a detection operation by the sensor SS. These ICs may be respectively mounted at different positions. A detection signal outputted by the sensor SS is outputted to the controller CT via the wiring board FWB1 and the driver DRV1. The controller CT executes an arithmetic processing for detecting the fingerprint or the like based on detection signals from the plurality of sensors SS.

Figure 3:
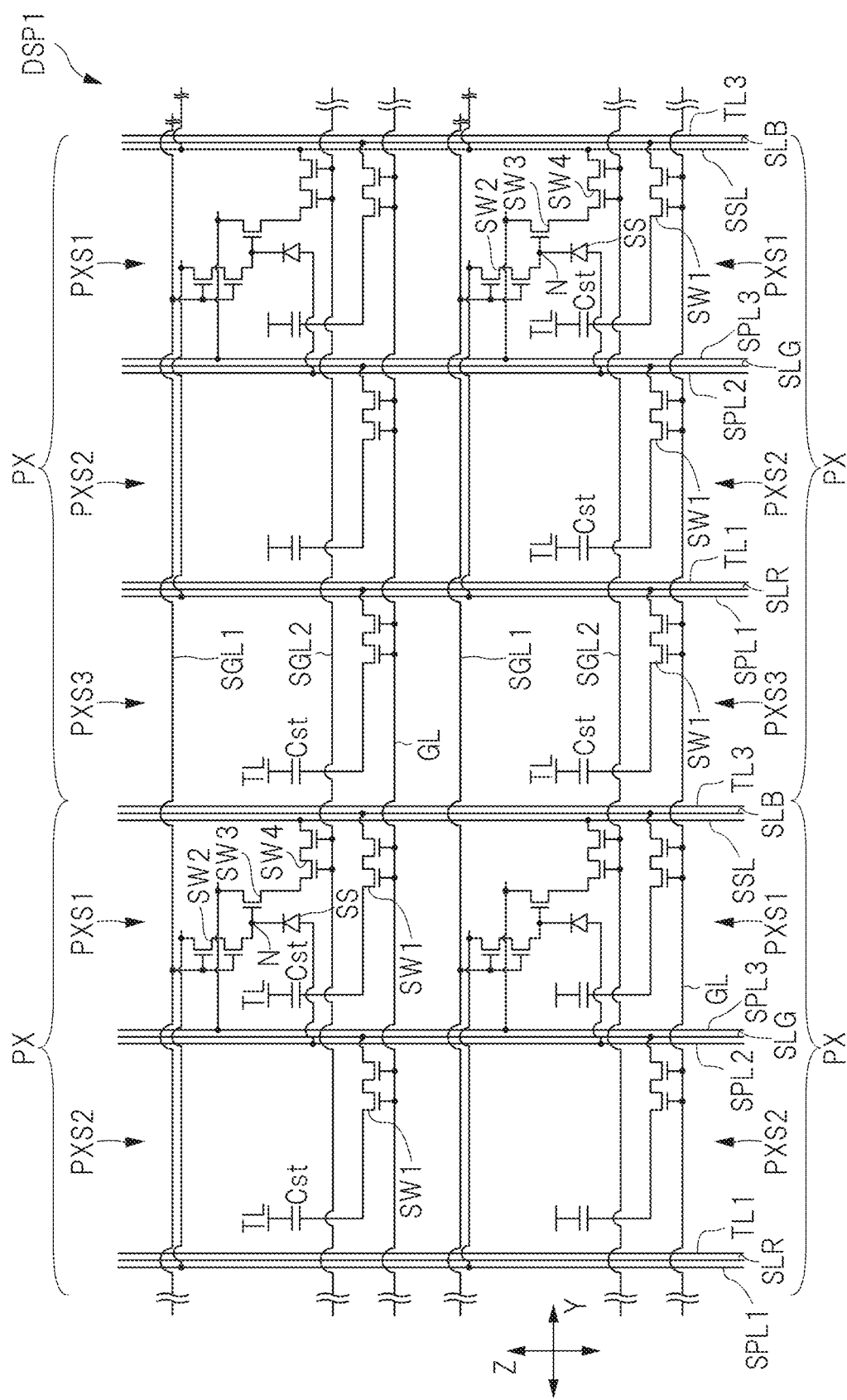
FIG. 3 is an equivalent circuit diagram showing a configuration example of sub-pixels included in pixels of the display device shown in FIG. 2.

FIG. 3 is an equivalent circuit diagram showing a configuration example of each sub-pixel included in the pixels of the display device shown in FIG. 2. Each of the sub-pixels PXS1, PXS2, PXS3 is located in a region partitioned by: a scanning line GL that extends along the X direction (first direction) and is arranged along the Y direction (second direction); and signal lines SLR, SLG, SLB that extend along the Y direction and are arranged along the X direction. The scanning line GL is a wiring, to which a scanning signal for selecting a pixel forming a display image is transmitted, and can be read as, for example, a pixel scanning line. The respective signal lines SLR, SLG, SLB are wirings for transmitting video signals for red, green, or blue, and can be each read as, for example, a pixel signal line. Further, in the following, when a signal line of a specific color is not suggested, this means any one of the signal lines SLR, SLG, SLB and may be simply referred to as a signal line SL (for example, see FIG. 4 described later). Similarly, in the following, if a sub-pixel of a specific color is not suggested, the sub-pixel may be simply referred to as a sub-pixel PXS.

Each of the sub-pixels PXS1, PXS2, PXS3 includes a switching element SW1. A gate electrode of the switching element SW1 is connected to the scanning line GL, a source electrode of the switching element SW1 is connected to the signal line SLR, SLG, or SLB of the corresponding color, and a drain electrode of the switching element SW1 is one electrode of a capacitor Cst. The other electrode of the capacitor Cst is connected to a touch detection line TL that functions as a feeder line. The touch detection line TL as a feeder line is a wiring for supplying a common potential in forming a display image, and can be read as, for example, a pixel feeder line.

A sensor circuit for the sensor SS (sensor circuit for driving the sensor SS) is mainly arranged in a region where the sub-pixel PXS3 selectively transmitting blue light is arranged, and is connected to the sensor SS. Provided as elements related to the sensor SS are a scanning line (first sensor scanning line) SGL1, a scanning line (second sensor scanning line) SGL2, a feeder line (first sensor feeder line) SPL1, a feeder line (second sensor feeder line) SPL2, a feeder line (third sensor feeder line) SPL3, and a signal line (sensor signal line) SSL.

The scanning line SGL1 and the scanning line SGL2 extend in the X direction and are arranged along the Y direction. The feeder line SPL1 is arranged so as to overlap with the signal line SLR in a plan view, the feeder line SPL2 and the feeder line SPL3 are arranged so as to overlap with the signal line SLG in a plan view, and the sensor signal line SSL is arranged so as to overlap with the signal line SLB in a plan view.

The sensor circuit for the sensor SS includes a switching element SW2, a switching element SW3, and a switching element SW4. FIG. 3 illustrates a case where each of the switching elements SW2, SW3, SW4 is an n-type TFT (Thin Film Transistor). However, as a modification example, the switching elements SW2, SW3, SW4 may be p-type TFTs.

One electrode of the sensor SS is connected to the feeder line SPL2, and the other electrode of the sensor SS is connected to a node N. The node N is connected to a drain electrode of the switching element SW2 and a gate electrode of the switching element SW3. A second voltage (VCOM) is applied to the one electrode of the sensor SS via the feeder line SPL2. The second voltage can be read as a reference voltage. When light is incident on the sensor SS, capacitance is formed between the one electrode of the sensor SS and the other electrode thereof.

A gate electrode of the switching element SW2 is connected to the scanning line SGL1, a source electrode of the switching element SW2 is connected to the feeder line SPL1, and a drain electrode of the switching element SW2 is connected to the node N. When the switching element SW2 is turned on in response to the scanning signal supplied from the scanning line SGL1, a potential of the node N is reset to a potential of a first voltage (first power supply potential) applied from the feeder line SPL1. The above-mentioned second voltage (reference voltage) shows a lower value than that of the first voltage, and the sensor SS is driven in a reverse bias.

A gate electrode of the switching element SW3 is connected to the node N, a source electrode of the switching element SW3 is connected to the feeder line SPL3, and a drain electrode of the switching element SW3 is connected to a source electrode of the switching element SW4. When the switching element SW3 is turned on by the above-mentioned capacitance formed in the sensor SS, a detection signal corresponding to the capacitance is outputted to the switching element SW4.

A gate electrode of the switching element SW4 is connected to the scanning line SGL2, the source electrode of the switching element SW4 is connected to the drain electrode of the switching element SW3, and a drain electrode of the switching element SW4 is connected to the sensor signal line SSL. When the switching element SW4 is turned on in response to a scanning signal supplied from the scanning line SGL2, the detection signal outputted from the switching element SW3 is outputted to the sensor signal line SSL.

A scanning signal is supplied to each of the scanning line SGL1 and the scanning line SGL2 at timing when detection by the sensor SS should be performed. When the scanning signal is supplied to the scanning line SGL1 and the scanning line SGL2, a detection signal generated by a photoelectric conversion element PC (see FIG. 4 described later) is outputted to the sensor signal line SSL. The detection signal outputted to the sensor signal line SSL is outputted to the controller CT (see FIG. 2) via, for example, the driver DRV1 (see FIG. 1).

Incidentally, besides the sensor SS, each of touch detection lines TL1, TL3 used for detecting proximity or contact of an external object (for example, finger FNG or the like) with respect to the display area DA is arranged so as to overlap with the signal line SLR or SLB in a plan view.

FIG. 3 illustrates a case where each of the switching elements SW2, SW4 has a double gate structure. However, as a modification example, each of the switching elements SW2, SW4 may have a single gate structure or a multi-gate structure.

<Array Substrate>

Figure 4:
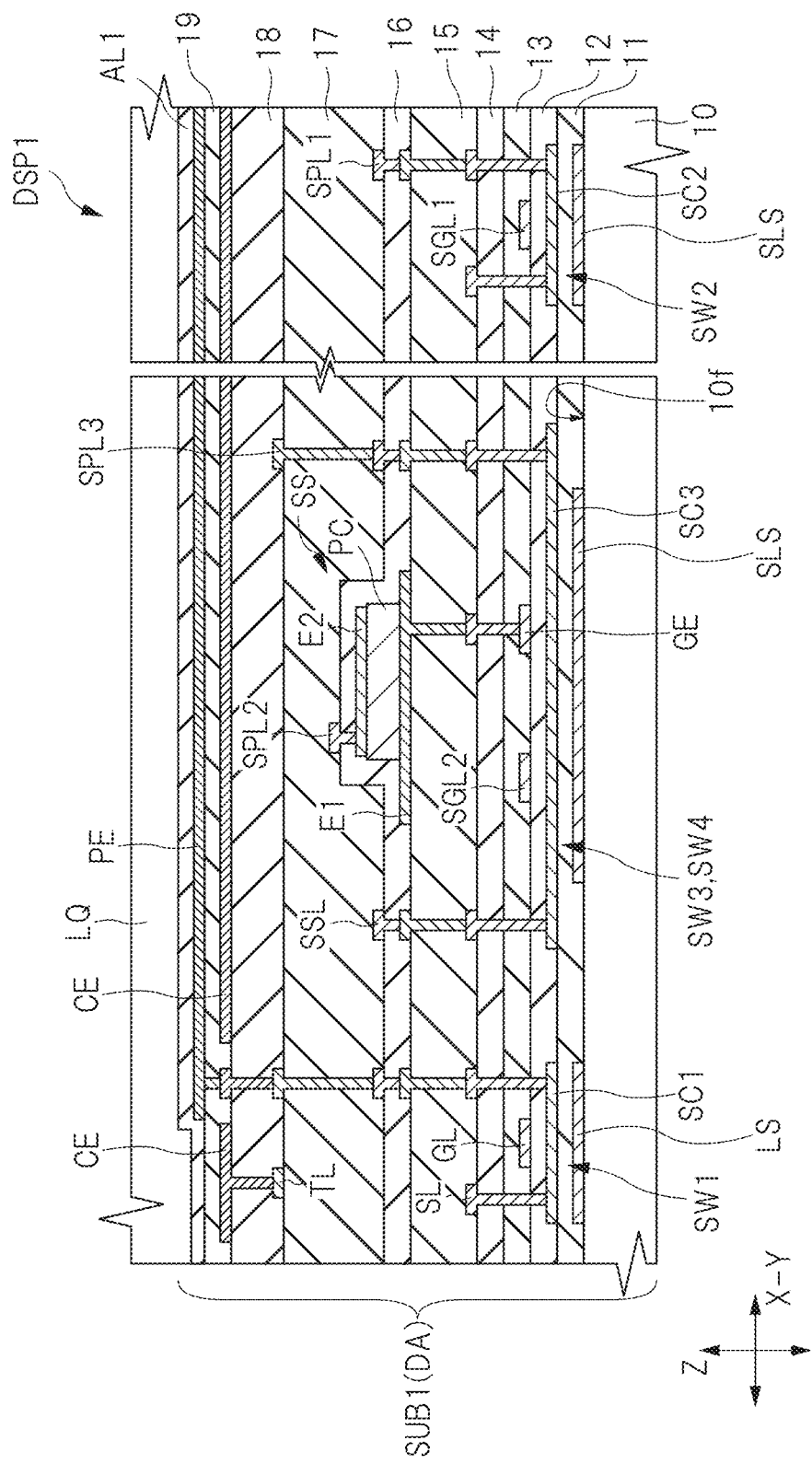
FIG. 4 an enlarged cross-sectional view showing a structural example of an array substrate shown in FIG. 1 in a display area.
Figure 5:
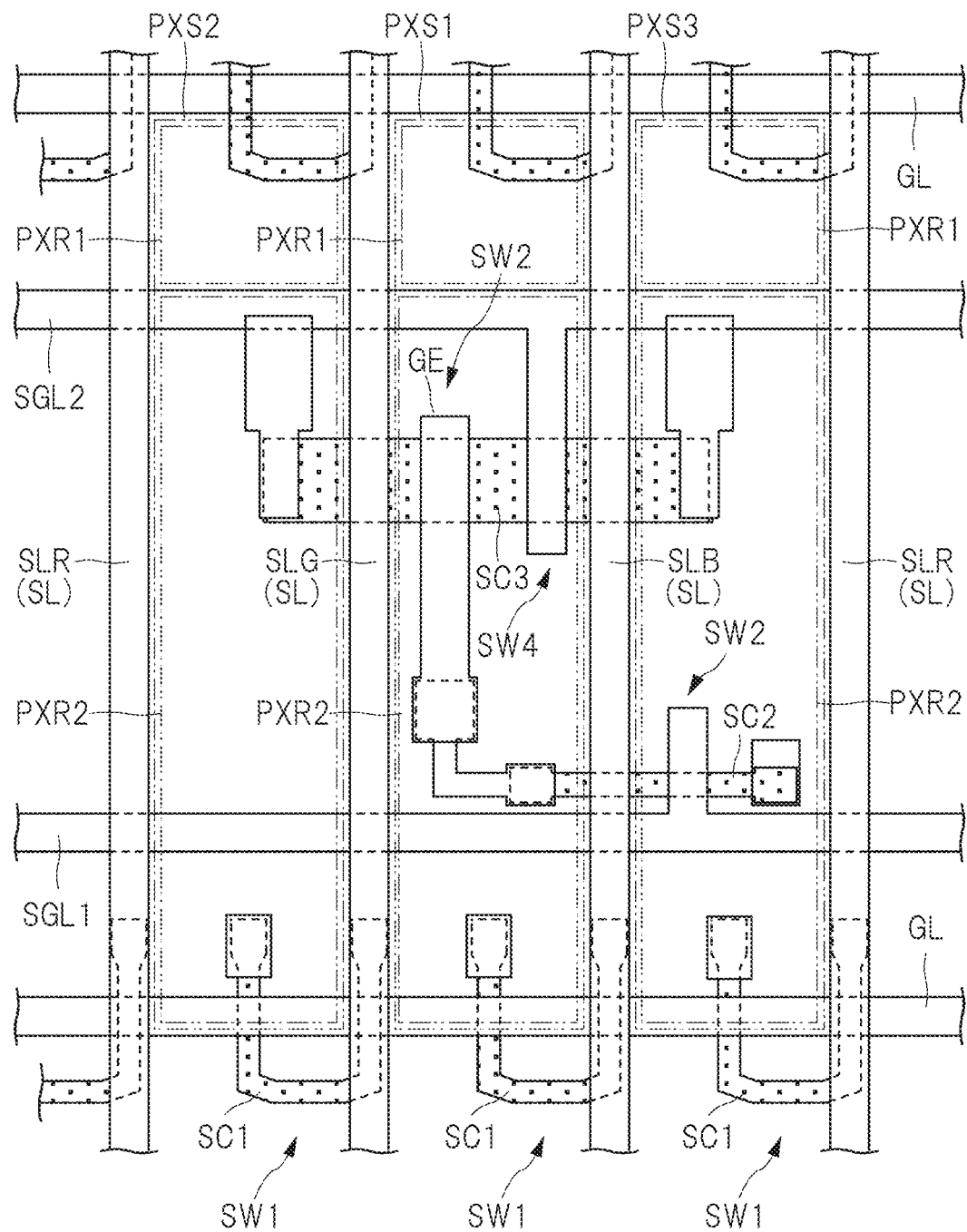
FIG. 5 is an enlarged plan view showing a structural example of the array substrate shown in FIG. 1 in the display area.

Next, an outline of the array substrate SUB1 shown in FIG. 1 will be described. FIG. 4 is an enlarged cross-sectional view showing a structural example of the array substrate shown in FIG. 1 in the display area. FIG. 5 is an enlarged plan view showing a structural example of the array substrate shown in FIG. 1 in the display area. In FIG. 4, since each configuration example of the switching elements SW1, SW2, SW3, SW4 is shown in one figure, a layout in a X-Y plane has a cross-section in the X direction and a cross-section in the Y direction that are mixed. A layout of each component in the X-Y plane follows an example shown in FIG. 5. As shown in FIG. 4, the array substrate SUB1 has a substrate (first substrate) 10, insulating films 11, 12, 13, 14, 15, 16, 17, 18, 19 laminated on a front surface 10f of the substrate 10, and an alignment film AL1.

The substrate 10 is, for example, a glass substrate or a resin substrate that has flexibility and is transparent to visible light. The insulating films 11, 12, 13, 14, 16, 19 are inorganic insulating films formed of an inorganic material(s). The insulating films 15, 17, 18 are organic insulating films mainly formed of an organic material(s). The insulating films 11, 12, 13, 14, 15, 16, 17, 18, 19 and the alignment film AL1 are sequentially laminated on the front surface 10f of the substrate 10.

The array substrate SUB1 includes, as elements related to image display, a signal line SL, a scanning line GL, a switching element SW1, a pixel electrode PE, a common electrode CE, and a touch detection line TL. The pixel electrode PE and the switching element SW1 are provided for each of the sub-pixels PXS1, PXS2, PXS3 (see FIG. 5). The common electrode CE is provided, for example, over the plurality of sub-pixels PXS1, PXS2, PXS3. In other words, the common electrode CE is provided, for example, across the plurality of sub-pixels PXS1, PXS2, PXS3.

The switching element SW1 includes a semiconductor layer SC1. The semiconductor layer SC1 is arranged between the insulating films 11 and 12. The scanning line GL is arranged between the insulating films 12 and 13 and opposes the semiconductor layer SC1. Incidentally, as a modification example, the scanning line GL may be arranged in another layer instead of a layer between the insulating films 12 and 13. The signal line SL is arranged between the insulating films 14 and 15, and is electrically connected to the semiconductor layer SC1 via a contact hole penetrating the insulating films 12, 13, 14.

In an example shown in FIG. 4, the light-shielding layer LS is arranged between the substrate 10 and the insulating film 11. In the example shown in FIG. 4, the entire semiconductor layer SC1 opposes the light-shielding layer LS. However, at least an opposite side of a region, which opposes the scanning line GL, in the semiconductor layer SC1 may oppose the light-shielding layer LS.

The pixel electrode PE is arranged between the insulating film 19 and the alignment film AL1, and is electrically connected to the semiconductor layer SC1 via a contact hole penetrating the insulating film 19 and via a plurality of relay electrodes laminated in a thickness direction of the array substrate SUB1. The touch detection line TL is arranged between the insulating films 17 and 18. The common electrode CE is arranged between the insulating films 18 and 19, and is electrically connected to the touch detection line TL via a contact hole penetrating the insulating film 18.

A common potential is supplied to the common electrode CE via the touch detection line TL. A video signal is supplied to the signal line SL, and a scanning signal is supplied to the scanning line GL. When the scanning signal is supplied to the scanning line GL, the video signal of the signal line SL is applied to the pixel electrode PE via the semiconductor layer SC1. At this time, since the common potential is supplied to the common electrode CE, an electric field caused by a potential difference between the common electrode and the video signal applied to the pixel electrode PE is generated between and around the pixel electrode PE and the common electrode CE. This electric field acts on the liquid crystal layer LQ.

The array substrate SUB1 has, as elements related to optical sensing using the sensor SS and besides the sensor light-shielding layer SLS, a switching element (second switching element) SW2, a scanning line (first scanning line) SGL1, a feeder line (first feeder line) SPL1, a switching element (third switching element) SW3, a gate electrode GE, a feeder line SPL2, a switching element (fourth switching element) SW4, a scanning line SGL2, a feeder line SPL3, and a sensor signal line SSL. The sensor SS includes an electrode (first electrode, lower electrode) E1, an electrode (second electrode, upper electrode) E2, and a photoelectric conversion element PC arranged between the electrodes E1 and E2.

The switching element SW2 includes a semiconductor layer SC2. The semiconductor layer SC2 is arranged between the insulating films 11 and 12. The scanning line SGL1 is arranged between the insulating films 12 and 13, and opposes the semiconductor layer SC2. Incidentally, the scanning line SGL1 may be arranged in another layer instead of a layer between the insulating films 12 and 13.

The sensor light-shielding layer SLS is arranged between the substrate 10 and the insulating film 11. In the example shown in FIG. 4, the array substrate SUB1 has a plurality of sensor light-shielding layers SLS, which are arranged between the semiconductor layer SC2 and the substrate 10 and between the semiconductor layer SC3 and the substrate 10, respectively.

The feeder line SPL1 is arranged between the insulating films 16 and 17, and electrical connected to the semiconductor layer SC2 via a contact hole penetrating the insulating film 16 and via a plurality of relay electrodes laminated in a thickness direction of the array substrate SUB1. A first potential (first power supply potential) is supplied to the feeder line SPL1.

The switching element SW3 includes a semiconductor layer SC3. The semiconductor layer SC3 is arranged between the insulating films 11 and 12. The gate electrode GE is arranged between the insulating films 12 and 13 and opposes the semiconductor layer SC3. The gate electrode GE is electrically connected to an electrode E1 via a contact hole penetrating the insulating films 13, 14 and via a relay electrode.

The photoelectric conversion element PC is located between the insulating films 15 and 16 that oppose the substrate 10. The electrode E1 is arranged between the photoelectric conversion element PC and the insulating film 15. An outer peripheral portion of the electrode E1 protrudes from the photoelectric conversion element PC, and is covered with the insulating film 16. The electrode E1 is electrically connected to the gate electrode via a contact hole penetrating the insulating film 15 below the photoelectric conversion element PC. The electrode E2 is arranged between the photoelectric conversion element PC and the insulating film 16. The electrode E2 is electrically connected to the feeder line SPL2 via a contact hole penetrating the insulating film 16 above the photoelectric conversion element PC.

The feeder line SPL2 is arranged between the insulating films 16 and 17, and is electrically connected to the electrode E2 via a contact hole penetrating the insulating film 16. A second potential (VCOM, reference potential) is supplied to the feeder line SPL2.

The switching element SW4 includes a semiconductor layer SC3. That is, the semiconductor layer SC3 is shared by the switching elements SW3, SW4. The scanning line SGL2 is arranged between the insulating films 12 and 13. The scanning line SGL2 opposes the semiconductor layer SC3, and does not overlap with the gate electrode GE. Incidentally, the scanning line SGL2 may be arranged in another layer instead of a layer between the insulating films 12 and 13.

The feeder line SPL3 is arranged between the insulating films 17 and 18, and is electrically connected to the semiconductor layer SC3 via a contact hole penetrating the insulating film 17 and via a plurality of relay electrodes laminated in a thickness direction of the array substrate SUB1. A third voltage (second power supply potential) is supplied to the feeder line SPL3.

The sensor signal line SSL is arranged between the insulating films 16 and 17, and is electrically connected to the semiconductor layer SC3 via a contact hole penetrating the insulating film 16 and via a plurality of relay electrodes laminated in the thickness direction of the array substrate SUB1.

Each of the light-shielding layer LS, the sensor light-shielding layer SLS, the signal line SL, the electrode E1, the touch detection line TL, the feeder lines SPL1, SPL2, SPL3, the sensor signal line SL, the plurality of relay electrodes, and the plurality of contact holes is made of a metal material(s). The relay electrode formed between each of the electrode E2, pixel electrode PE, common electrode CE, and insulating film 18 and the insulating film 19 is made of a transparent conductive material such as ITO (Indium Tin Oxide) or the like.

The electrode E1 made of a metal material also functions as a light-shielding layer, and suppresses incidence of light on the photoelectric conversion element PC from below. The photoelectric conversion element PC is, for example, a photodiode, and outputs an electric signal (detection signal) according to the incident light. More specifically, a PIN (Positive Intrinsic Negative) photodiode can be used as the photoelectric conversion element PC. This type of photodiode has a p-type semiconductor layer, an i-type semiconductor layer, and an n-type semiconductor layer. The p-type semiconductor layer is located on an electrode E2 side, the n-type semiconductor layer is located on an electrode E1 side, and the i-type semiconductor layer is located between the p-type semiconductor layer and the n-type semiconductor layer. Further, an organic photodetector may be used instead of the PIN photodiode.

As shown in FIG. 5, each of the scanning line GL, the scanning line SGL1, and the scanning line SGL2 extends in the X direction and is arranged along the Y direction. The scanning lines SGL1 and the scanning lines SGL2 are arranged next (adjacent) to each other in the Y direction. The scanning lines SGL1 and the scanning lines SGL2 are arranged between two scanning lines GL adjacent to each other. Each of the plurality of signal lines SL extends in the Y direction, and is arranged along the X direction.

Each of the sub-pixels PXS1, PXS2, PXS3 is arranged in a region surrounded by a scanning line GL adjacent to each other in the Y direction and two signal lines SL adjacent to each other in the X direction. A visible light transmission region PXR1, which each of the sub-pixels PXS1, PXS2, PXS3 has, is surrounded by a scanning line GL, a scanning line GL2, and two signal lines SL adjacent to each other. A light-shielding region PXR2, which each of the sub-pixels PXS1, PXS2, PXS3 has, is surrounded by a scanning line SGL2, a scanning line GL, and two signal lines SL adjacent to each other.

The scanning line SGL1 has a branch portion (convex portion) extending in the Y direction. This branch portion functions as a gate electrode of the switching element SW2. A semiconductor layer SC2 is arranged in a region that overlaps with the gate electrode of the switching element SW2 in a plan view.

The semiconductor layer SC2 is arranged so as to straddle the light-shielding region PXR2 of the sub-pixel PXS3 and the light-shielding region PXR2 of the sub-pixel PXS1. A part of the semiconductor layer SC2 is arranged at a position overlapping with the signal line SLB for transmitting the video signal that drives the liquid crystal of the sub-pixel PXS1. An island-shaped relay electrode is arranged at a position which is located in the light-shielding region PXR2 of the sub-pixel PXS3 and that overlaps with the semiconductor layer SC2. This relay electrode is electrically connected to the semiconductor layer SC2 via the contact hole.

The gate electrode GE of the switching element SW3 is arranged in the light-shielding region PXR2 of the sub-pixel PXS1, and is electrically connected to the electrode E1 shown in FIG. 4 via the relay electrode.

The scanning line SGL2 has a branch portion (convex portion) extending in the Y direction. This branch portion functions as a gate electrode of the switching element SW4.

The semiconductor layer SC3 is arranged at a position overlapping with the gate electrode of the switching element SW4 (that is, the branch portion of the scanning line SGL2).

The semiconductor layer SC3 is arranged so as to straddle the light-shielding region PXR2 of the sub-pixel PXS2, the light-shielding region PXR2 of the sub-pixel PXS1, and the light-shielding region PXR2 of the sub-pixel PXS3, and a part thereof overlaps with the signal line SLG corresponding to the sub-pixel PXS2 and the signal line SLB corresponding to the sub-pixel PXS3. An island-shaped relay electrode is arranged at a position which is located in the light-shielding region PXR2 of the sub-pixel PXS2 and that overlaps with the semiconductor layer SC3. This relay electrode is a conductive member that electrically connects the semiconductor layer SC3 and the feeder line SPL3 shown in FIG. 7 which will be described later.

A switching element SW1 is arranged, as an element related to image display, between the scanning line SGL1 and the scanning line GL. The semiconductor layer SC1 included in the switching element SW1 overlaps with the signal line SL of the color to which a part thereof corresponds. The semiconductor layer SC1 is electrically connected to the signal line SL via a contact hole at a portion overlapping with the signal line SL.

Figure 6:
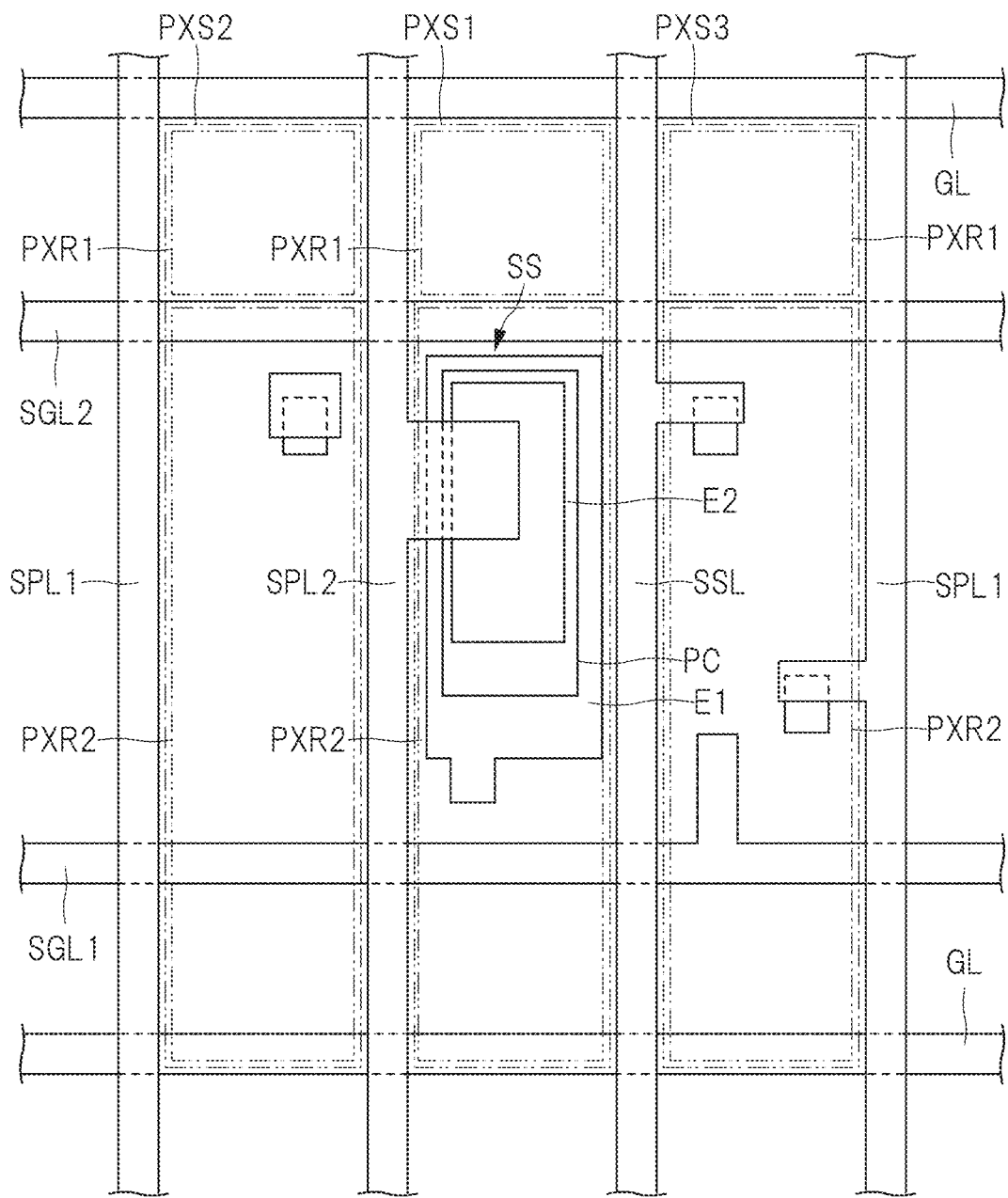
FIG. 6 is an enlarged plan view showing elements of a layer in which a photoelectric conversion element shown in FIG. 4 is arranged in the same plan view as that of FIG. 5.

FIG. 6 is an enlarged plan view showing elements of the layer in which the photoelectric conversion element shown in FIG. 4 is arranged in the same plan view as that of FIG. 5. Each member shown in FIG. 6 illustrates a member provided between the insulating film 15 and the insulating film 18 shown in FIG. 4 in principle. However, in FIG. 6, in order to make it easy to understand a positional relationship with each member shown in FIG. 5, the scanning line GL, the scanning line SGL1, and the scanning line SGL2 shown in FIG. 5 are illustrated.

The electrode E1 of the sensor SS, the photoelectric conversion element PC, and the electrode E2 are arranged in the light-shielding region PXR2 of the sub-pixel PXS3. The electrode E1 is electrically connected to the gate electrode GE (see FIG. 5) via the relay board shown in FIG. 5. The electrode E2 arranged on the photoelectric conversion element PC is electrically connected to the feeder line SPL2. The feeder line SPL2 extends in the Y direction so as to overlap with the signal line SLG (see FIG. 5) corresponding to the sub-pixel PXS2 in a plan view. The feeder line SPL2 has a branch portion (convex portion) extending along the X direction, and contacts with the electrode E2 of the sensor SS at this branch portion. According to this, the feeder line SPL2 and the sensor SS are electrically connected, and a voltage (VCOM) can be applied to the sensor SS.

Figure 7:
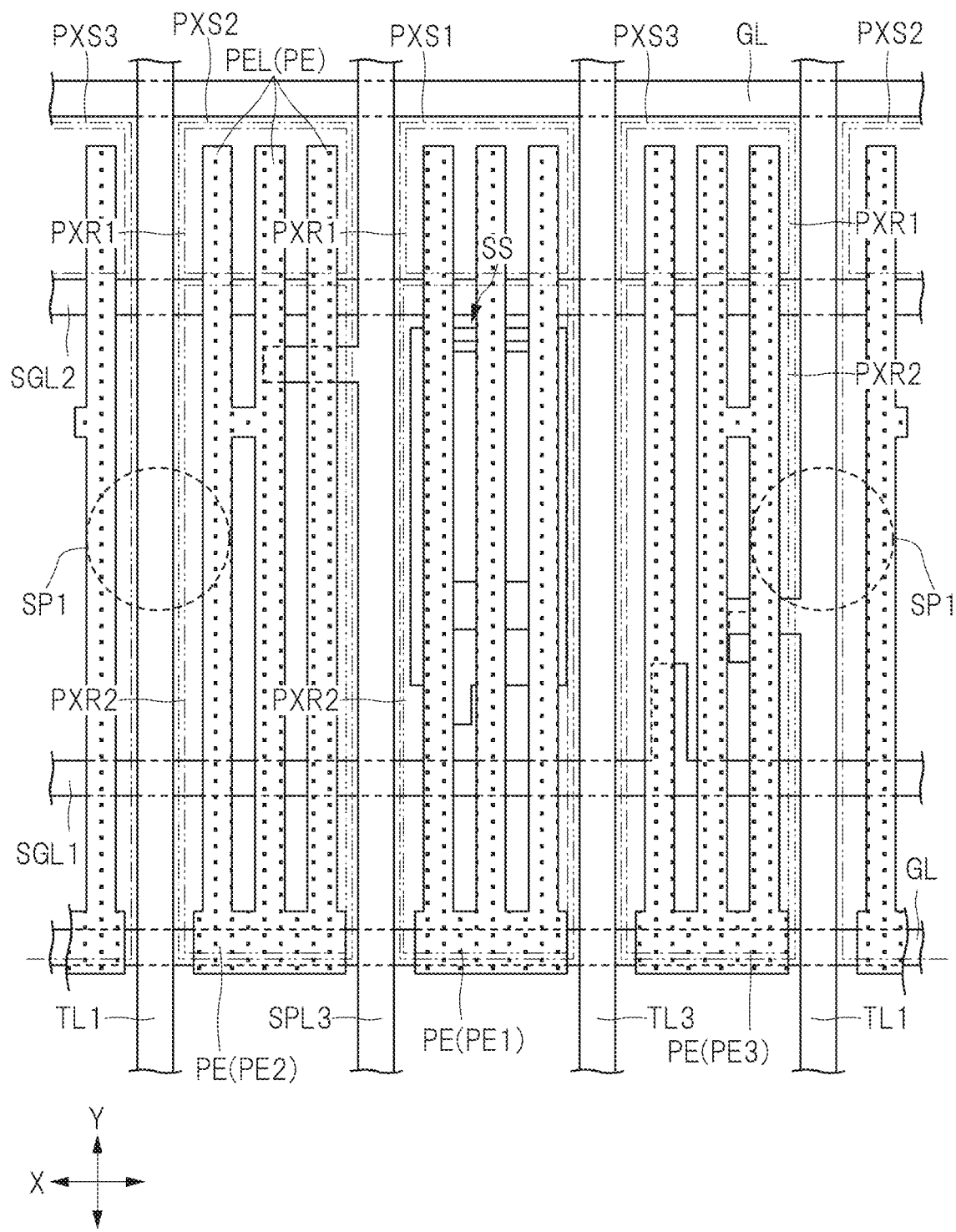
FIG. 7 is an enlarged plan view showing an example of a planar layout of pixel electrodes shown in FIG. 4 in the same plan view as that of FIG. 5.

In the light-shielding region PXR2 of the sub-pixel PXS2, an island-shaped relay electrode for electrically connecting the feeder line SPL3 and the semiconductor layer SC3 shown in FIG. 4 is arranged. As shown in FIG. 7 described later, the feeder line SPL3 is arranged so as to extend in the Y direction at a position overlapping with the signal line SLG shown in FIG. 5 and the feeder line SPL2 shown in FIG. 6 in a plan view.

In the light-shielding region PXR2 of the sub-pixel PXS3, an island-shaped relay electrode for electrically connecting the sensor signal line SSL and the semiconductor layer SC3 shown in FIG. 5 is arranged. The sensor signal line SSL extends in the Y direction so as to overlap with the signal line SLB corresponding to the sub-pixel PXS3 in a plan view. The sensor signal line SSL has a branch portion (convex portion) extending in the X direction, and is electrically connected to a relay electrode that is arranged in a lower layer of the branch portion at this branch portion.

An island-shaped relay electrode electrically connecting the feeder line SPL1 and the semiconductor layer SC2 shown in FIG. 5 is arranged in the light-shielding region PXR2 of the sub-pixel PXS3. The feeder line SPL1 extends in the Y direction so as to overlap with the signal line SLR corresponding to the sub-pixel PXS1 in a plan view. The feeder line SPL1 has a branch portion (convex portion) extending in the X direction, and is electrically connected to a relay electrode arranged in a lower layer of the branch portion at this branch portion.

In an example shown in FIG. 6, the sensor SS is arranged in the sub-pixel PXS1 that selectively transmits blue light. In the sub-pixel PXS1 in which the sensor SS is arranged, an opening area of a light-shielding film may be smaller than those of the other sub-pixels PXS1, PXS2. Blue light is less susceptible to the opening area being made small in comparison with red and green light. Consequently, when the sensor SS is arranged in any one of the sub-pixels PXS1, PXS2, PXS3, it is preferable to arrange the sensor SS in the sub-pixel PXS1 that selectively transmits blue light.

FIG. 7 is an enlarged plan view showing an example of a planar layout of the pixel electrodes shown in FIG. 4 in the same plan view as that of FIG. 5. In FIG. 7, in order to make it easy to understand a positional relationship with each member shown in FIG. 6, the scanning line GL, the scanning line SGL1 and the scanning line SGL2 shown in FIG. 5, and the sensor SS shown in FIG. 6 are illustrated. Further, FIG. 7 illustrates each of the feeder lines SPL3 arranged between the insulating films 17 and 18 shown in FIG. 4, and the touch detection lines TL1, TL3 shown in FIG. 3. Furthermore, in FIG. 7, a position of the spacer member SP1 described later in a plan view is shown by a dotted line.

The feeder line SPL3 extends in the Y direction so as to overlap with the signal line SLG (see FIG. 5) corresponding to the sub-pixel PXS2 in a plan view. The feeder line PL3 has a branch portion (convex portion) extending in the X direction X. The feeder line SPL3 is electrically connected to the relay electrode that is arranged in the light-shielding region PXR2 of the sub-pixel PXS2 at this branch portion. The feeder line SPL3 and the switching element SW3 are electrically connected via this branch portion, and a third voltage (second power supply voltage) can be applied to the switching element SW3.

Pixel electrodes PE having the same shape are arranged in the respective sub-pixels PXS1, PXS2, PXS3. Each of the pixel electrodes PE is arranged in a region surrounded by the two scanning lines GL and the two signal lines SL (that is, a region corresponding to a sub-pixel). In an example shown in FIG. 7, the pixel electrode PE has a plurality of line portions (extended portions) PEL extending in the Y direction and lining up along the X direction (three in an example of FIG. 7). The light-shielding region PXR2 and the visible light transmission region PXR1, which each of the sub-pixels PXS1, PXS2, PXS3 has, overlap with a line portion PEL of the pixel electrode PE. A detailed structure of the pixel electrode PE will be described later.

Each of the pixel electrodes PE overlaps with at least a part of elements (switching elements SW2, SW3, SW4) constituting a sensor circuit for the sensor SS in a plan view. For example, the pixel electrode PE of the sub-pixel PXS2 is overlapped with (superimposed on) the semiconductor layer SC3 (see FIG. 5) or the like in a plan view. The pixel electrode PE of the sub-pixel PXS3 is overlapped with the semiconductor layer SC2 (see FIG. 5), the gate electrode GE (see FIG. 5), the semiconductor layer SC3, and the like in a plan view. The pixel electrode PE of the sub-pixel PXS1 is overlapped with the semiconductor layer SC2, the semiconductor layer SC3, and the like in a plan view. Incidentally, the pixel electrode PE of the sub-pixel PXS1 is also overlapped with the photoelectric conversion element PC (see FIG. 6) constituting the sensor SS in a plan view.

<Opposed Substrate>

Figure 8:
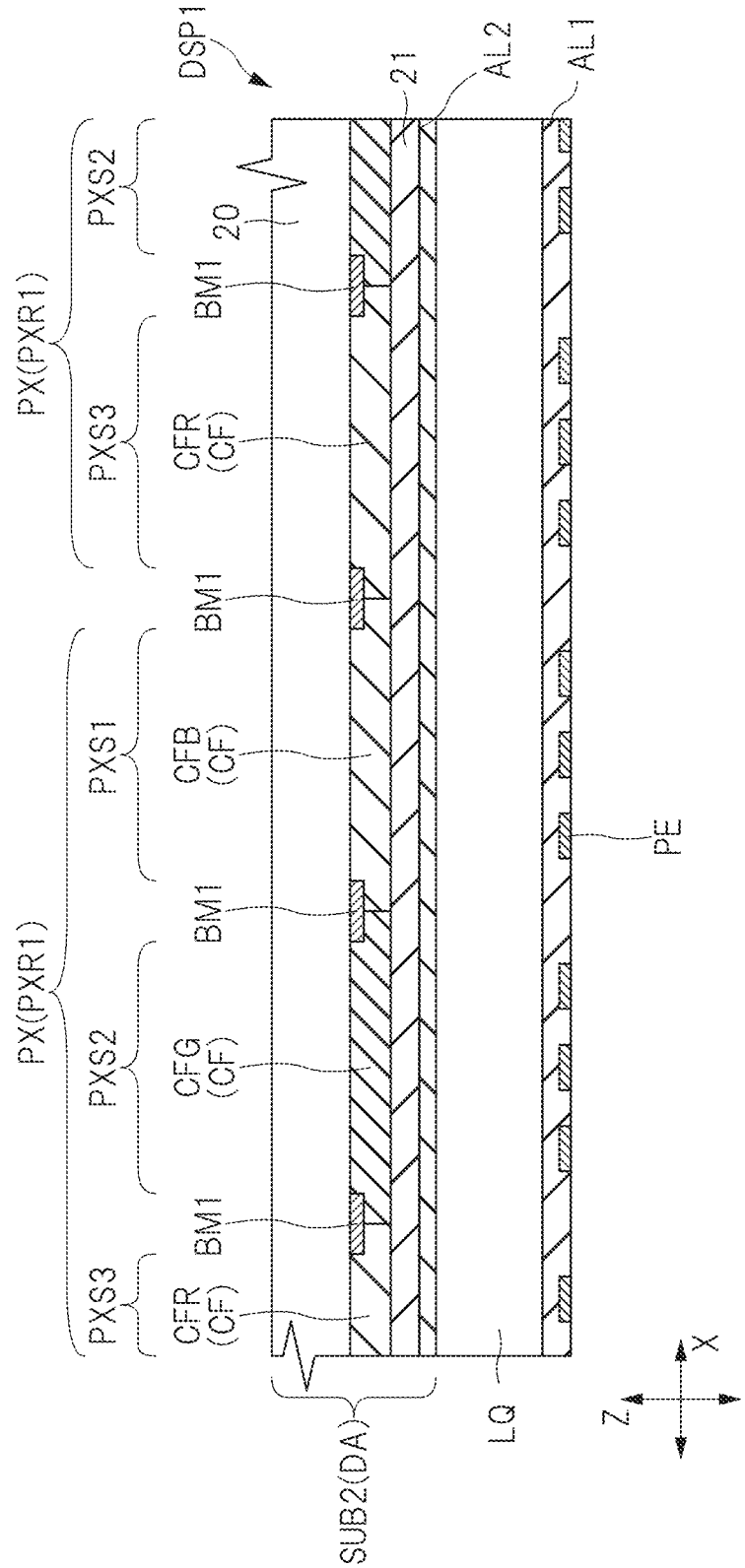
FIG. 8 an enlarged cross-sectional view showing a structural example of the opposed substrate shown in FIG. 1 in the display area.
Figure 10:
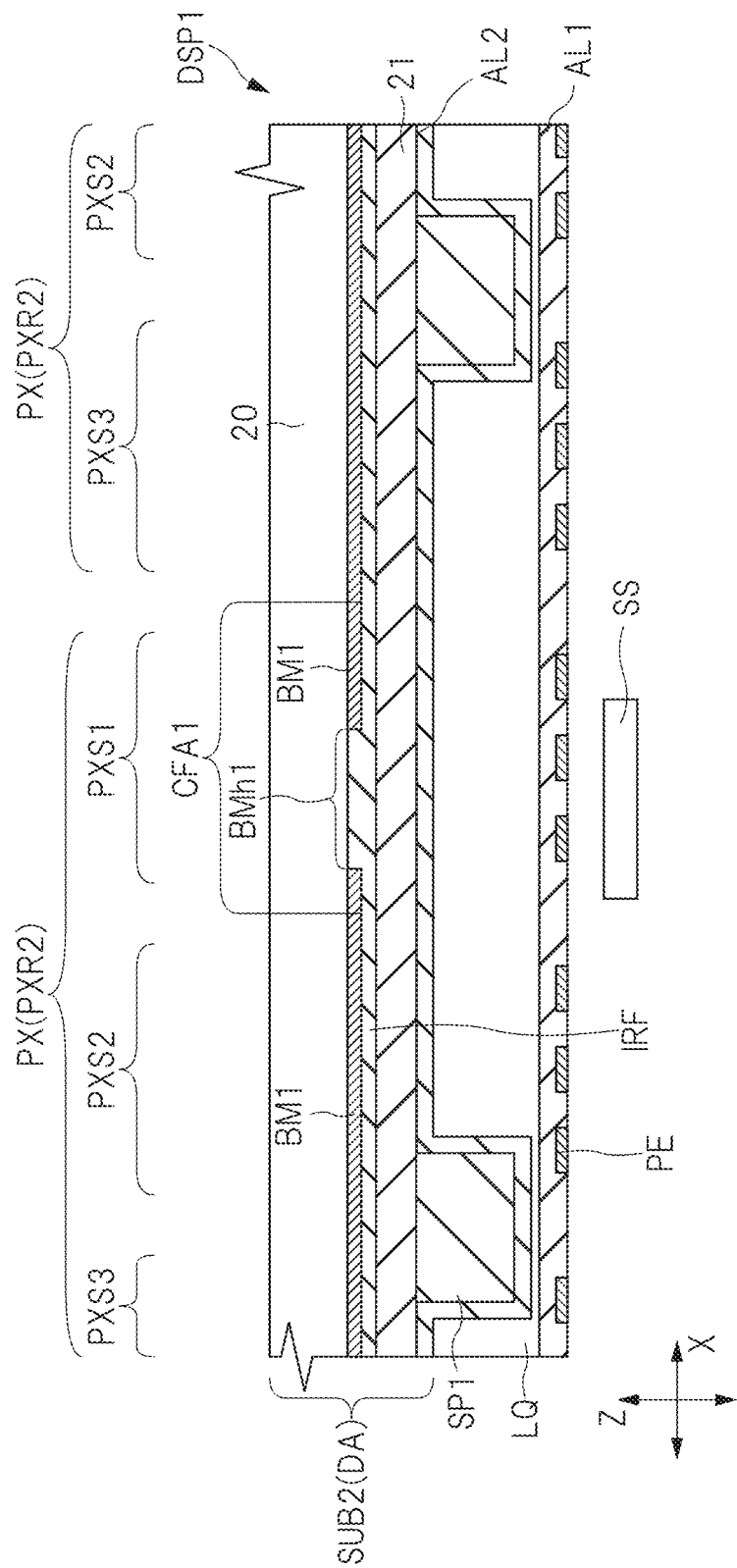
FIG. 10 is an enlarged cross-sectional view taken along line B-B of FIG. 9.

Next, a structural example of the opposed substrate SUB2 shown in FIG. 1 will be described. FIG. 8 is an enlarged cross-sectional view showing a structural example of the opposed substrate shown in FIG. 1 in a display area. Incidentally, FIG. 8 is an enlarged cross-sectional view taken along line A-A shown in FIG. 9 described later. FIG. 9 is an enlarged plan view showing an example of a planar shape of the light-shielding film shown in FIG. 8. FIG. 10 is an enlarged cross-sectional view taken along line B-B of FIG. 9.

As shown in FIG. 8, the display device DSP1 has a plurality of color filters CF formed between the liquid crystal layer LQ and the substrate (second substrate) 20, and a light-shielding film (first light-shielding film) BM1 that is formed between the liquid crystal layer LQ and the substrate 20 and formed in a grid pattern so as to partition the pixel PX (specifically, the sub-pixels PXS1, PXS2, PXS3). Further, in an example shown in FIG. 8, the opposed substrate SUB2 of the display device DSP1 has, besides the color filter CF and the light-shielding film BM1, an insulating film (organic insulating film) 21 that covers the color filter CF, and an alignment film AL2 that covers the insulating film 21.

The plurality of color filters CF include a color filter (first color filter) CFB that selectively transmits light in a blue wavelength range (first wavelength range: 450 to 495 nm), a color filter (second color filter) CFG that selectively transmits light in a green wavelength range (second wavelength range: 495 to 570 nm), and a color filter (third color filter) CFR that selectively transmits light in a red wavelength range (third wavelength range: 620 to 750 nm). The color filters CFR, CFG, CFB are arranged in order along the X direction.

In the visible light transmission region PXR1 shown in FIG. 8, the color filters CFR, CFG, CFB are regularly arranged as a repetitive pattern along the X direction. However, in the light-shielding region PXR2 shown in FIG. 9, there may be a portion(s) where the color filters CFR, CFG, CFB are not arranged. For example, in an example shown in FIG. 10, each light-shielding region PXR2 of the sub-pixel PXS1, PXS2, PXS3 includes a portion where no color filter is arranged. In the sub-pixel PXS1 shown in FIG. 10, the sensor SS is arranged at a position overlapping with a region CFA1 where the color filter CFB is not arranged.

As shown in FIG. 9, each of the sub-pixels PXS1, PXS2, PXS3 has a visible light transmission region PXR1 that allows visible light to pass through an opening (display opening) BMhP formed in the light-shielding film BM. Further, each of the sub-pixels PXS1, PXS2, PXS3 is arranged next to the visible light transmission region PXR1 in the Y direction, and has a light-shielding region PXR2 covered with the light-shielding film BM.

The light-shielding film BM1 has a plurality of portions BMx extending in the X direction, and a plurality of portions BMy extending in the Y direction. The plurality of portions BMx and the plurality of portions BMy intersect with one another. The opening BMhP is formed between two portions BMx adjacent to each other and two portions BMy adjacent to each other. Further, the light-shielding film BM1 has an opening BMh1 formed at a position overlapping with the sensor SS (see FIG. 6). The opening BMh1 penetrates the light-shielding film BM1 in a thickness direction thereof. The opening BMh1 is an opening related to optical sensing, and is distinguished from a plurality of openings BMhP related to image display provided in the visible light transmission region PXR1 of the pixel PX.

As described with reference to FIG. 1, an optical sensing mechanism included in the display device DSP1 of the present embodiment converts light incident on the sensor SS, which is an optical sensor, into an electrical signal via the photoelectric conversion element PC (see FIG. 6) of the sensor SS. Therefore, in order to improve accuracy of sensing, it is preferable to remove noise contained in the light that passes through the opening BMh1 shown in FIG. 10 and that reaches the sensor SS.

In a case of the present embodiment, in the sub-pixel PXS1 in which the sensor SS is arranged, the color filter CFB (see FIG. 8) is not arranged in a region overlapping with the sensor SS. The vicinity of the opening BMh1 of the light-shielding film BM1 is uniformly covered with an insulating film 21. In this case, the light that passes through the opening BMh1 of the light-shielding film BM1 and that reaches the sensor SS is less likely to be affected by the color filter, so that the noise of the light incident on the sensor SS can be reduced. Incidentally, there are various modification examples about arrangement of the color filters. For example, an optical filter IRF such as an infrared light shielding filter may be provided in a path of the light passing through the opening BMh1.

In addition, as shown in FIG. 10, the display device DSP1 further has a spacer member (first spacer member) SP1 which is arranged between the substrate 10 (see FIG. 4) and the substrate 20 and that maintains a thickness of the liquid crystal layer LQ. Specifically, the spacer member SP1 is formed between the alignment film AL2 and the insulating film 21, and is formed so as to project into the liquid crystal layer LQ. As shown in FIG. 7, in a plan view (specifically, a perspective plan view seen from a substrate 20 side to a substrate 10 (see FIG. 4) side), the spacer member SP1 is arranged at a position overlapping with at least one of the sub-pixel PXS2 and the sub-pixel PXS3. In the examples shown in FIGS. 7 and 10, the spacer member SP1 is arranged so as to straddle the sub-pixel PXS2 and the sub-pixel PXS3. Incidentally, as a modification example, the spacer member SP1 may be also arranged at a position of any one of the sub-pixel PXS2 or the sub-pixel PXS3.

The spacer member SP1 is a member for maintaining a thickness of the liquid crystal layer LQ, in other words, a gap between the array substrate SUB1 and the opposed substrate SUB2. For example, one spacer member SP1 is formed for each of a plurality of pixels PX. The spacer member SP1 is formed of, for example, an organic material that is transparent to visible light.

The spacer member SP1 has an optical property of transmitting visible light, but when light passes through the spacer member SP1, refraction or the like of light occurs. Consequently, from the viewpoint of reducing the optical influence of the spacer member SP1, it is preferable that the following conditions are satisfied. First, when the spacer member SP1 is formed on the color filter, it is preferable that the spacer member SP1 is not arranged so as to straddle the mutually different color filters. Further, in a plan view, it is preferable that the spacer member SP1 and its peripheral region overlap with the light-shielding film BM1 (FIG. 9). Furthermore, from the viewpoint of reducing an influence of the spacer member SP1 on sensing by the sensor SS (see FIG. 10), it is preferable that a separation distance between the opening BMh1 and the spacer member SP1, which are shown in FIG. 10, is sufficiently long.

In the case of the present embodiment, as shown in FIG. 7, the spacer member SP1 is arranged so as to straddle the sub-pixel PXS2 and the sub-pixel PXS3. Meanwhile, as shown in FIG. 10, the opening BMh1 is arranged in the sub-pixel PXS1. Consequently, the separation distance between the opening BMh1 and the spacer member SP1 can be made sufficiently long. Further, since the spacer member SP1 is arranged in the light-shielding region PXR2, the spacer member SP1 is covered with a portion BMx of the light-shielding film BM1 shown in FIG. 9. Furthermore, in the example shown in FIG. 10, no color filter is arranged between the spacer member SP1 and the light-shielding film BM1.

<Pixel Electrode>

Figure 11:
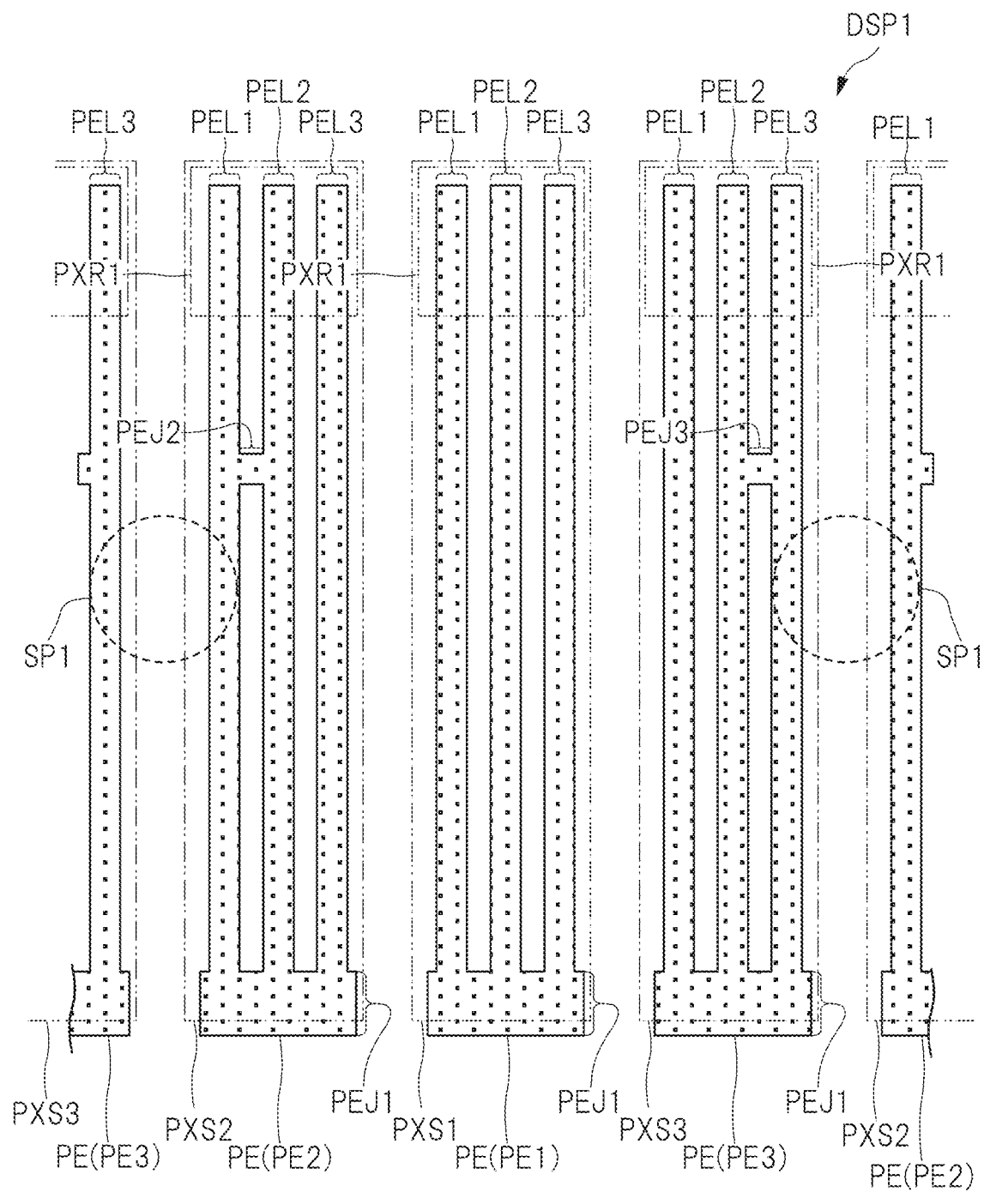
FIG. 11 is a plan view showing a detailed structure of a pixel electrode and a spacer member shown in FIG. 7.

Next, a structure of the pixel electrode shown in FIG. 7 will be described. FIG. 11 is a plan view showing a detailed structure of the pixel electrode shown in FIG. 7 and showing a spacer member. As shown in FIG. 11, a plurality of pixel electrodes PE each have a pixel electrode (first pixel electrode) PE1 arranged in the sub-pixel (first sub-pixel) PXS1, a pixel electrode (second pixel electrode) PE2 arranged in the sub-pixel (second sub-pixel) PXS2, and a pixel electrode (third pixel electrode) PE3 arranged in the sub-pixel (third sub-pixel) PXS3.

Each of the pixel electrodes PE1, PE2, PE3 includes a line portion (first line portion) PEL1, a line portion (second line portion) PEL2, and a line portion (third wire portion) PEL3 that extend in the Y direction and are arranged so as to be separated from one another at respective one ends thereof. The plurality of line portions PEL (see FIG. 7) are arranged in order of the line portion PEL1, the line portion PEL2, and the line portion PEL3 in the X direction. Further, each of the pixel electrodes PE1, PE2, PE3 includes a connecting portion PEJ1 (first connecting portion) formed so as to be connected to the respective other ends of the line portion PEL1, the line portion PEL2, and the line portion PEL3. A part of the connecting portion PEJ1 is connected to a drain of the switching element SW1 via the contact hole shown in FIG. 4.

Each of the plurality of pixel electrodes PE is divided into the line portions PEL1, PEL2, PEL3 that are separated from one another, so that liquid crystal can be easily driven. In particular, an end portion opposite to the connecting portion PEJ1 is arranged in the visible light transmission region PXR1 of each of the sub-pixels PXS1, PXS2, and PXS3. Therefore, at the end portion opposite to the connecting portion PEJ1, the line portions PEL1, PEL2, PEL3 are separated from one another, so that the liquid crystal in the vicinity of the visible light transmission region PXR1 can be efficiently driven.

In addition, when the line portions PEL1, PEL2, PEL3 are separated from one another in the visible light transmitting region PXR1, visible light transmittance in the visible light transmitting region PXR1 can be increased (enhanced). When an area of the visible light transmitting region PXR1 is smaller than an area of the light-shielding region PR2 like the present embodiment, it is preferable that the visible light transmittance in the visible light transmitting region PXR1 is made as high as possible.

Furthermore, the line portions PEL1, PEL2, PEL3 are electrically connected to one another via the connecting portion PEJ1. Consequently, when a signal pulse is applied to a specific pixel electrode PE, the same signal pulse can be applied to each of the line portions PEL1, PEL2, PEL3.

By the way, when the spacer member SP1 is arranged at such a position as to overlap with a part of the pixel electrode PE like the present embodiment, it has been turned out that the pixel electrode PE may be partially damaged due to a load from outside. For example, the spacer member SP1 shown in FIG. 11 is arranged at a position overlapping with the line portion PEL1 of the pixel electrode PE2 in a plan view. In this case, if the load from the outside is transmitted to the line portion PEL1 of the pixel electrode PE2 via the spacer member SP1, the line portion PEL1 may be damaged. If the line portion PEL1 of the pixel electrode PE2 is disconnected at a position overlapping with the spacer member SP1, the signal pulse may not be applied from such a position or portion to the end portion of the line portion PEL1 (an end portion opposite to the connecting portion PEJ1).

Thus, in the present embodiment, the following configuration is used as a countermeasure against the disconnection caused by the line portion PEL1 of the pixel electrode PE2 being arranged at a position overlapping with the spacer member SP1. That is, the pixel electrode PE2 further has connecting portion (second connecting portion) PEJ2 that connects the line portion PEL1 and the line portion PEL2 arranged next to the line portion PEL1. The connecting portion PEJ2 of the pixel electrode PE2 is arranged between a region where the line portion PEL1 of the pixel electrode PE2 overlaps with the spacer member SP1 and one end portion of the line portion PEL1 of the pixel electrode PE2 (an end portion opposite to the connecting portion PEJ1).

Consequently, even if the line portion PEL1 of the pixel electrode PE2 is disconnected at the position overlapping with the spacer member SP1, a signal pulse is applied from such a position or portion to the end portion of the line portion PEL1 (an end portion opposite to the connecting portion PEJ1) via the line portion PEL2 and the connecting portion PEJ2. Therefore, even when the spacer member SP1 overlaps with the line portion PEL1 of the pixel electrode PE2, an operation of driving the liquid crystal in the visible light transmission region PXR1 can be stabilized.

Further, depending on a plane size of the spacer member SP1, the spacer member SP1 may overlap with a plurality of line portions of the pixel electrode PE. For example, in an example shown in FIG. 11, in a plan view, the spacer member SP1 is arranged at a position overlapping with each of the line portion PEL1 of the pixel electrode PE2 and the line portion PEL3 of the pixel electrode PE3. In this case, when an external force is applied to the spacer member SP1, the line portion PEL3 of the pixel electrode PE3 may be damaged in addition to the line portion PEL1 of the pixel electrode PE2.

Thus, in the present embodiment, the following configuration is used as a countermeasure against the disconnection caused by the line portion PEL1 of the pixel electrode PE2 being arranged at the position overlapping with the spacer member SP1. That is, the pixel electrode PE3 further has a connecting portion (third connecting portion) PEJ3 that connects the line portion PEL3 and the line portion PEL2 arranged next to the line portion PEL3. The connecting portion PEL3 of the pixel electrode PE3 is arranged between a region where the line portion PEL3 of the pixel electrode PE3 overlaps with the spacer member SP1 and one end portion of the line portion PEL3 of the pixel electrode PE3 (an end portion opposite to the connecting portion PEJ1).

Consequently, even if the line portion PEL3 of the pixel electrode PE3 is disconnected at the position overlapping with the spacer member SP1, a signal pulse is applied from such a position or portion to an end portion of the line portion PEL3 (an end portion opposite to the connecting portion PEJ1) via the line portion PEL2 and the connecting portion PEJ3. Therefore, even when the spacer member SP1 overlaps with the line portion PEL3 of the pixel electrode PE3, an operation of driving the liquid crystal can be stabilized.

Meanwhile, in the case of the present embodiment, since the sensor SS (see FIG. 7) is placed in the sub-pixel PXS1, the spacer member SP1 is not arranged on the sub-pixel PXS1 from the viewpoint of making a distance between the sensor SS and the spacer member SP1 sufficiently long. Consequently, the spacer member SP1 does not overlap with the pixel electrode PE1. When each of the line portions PEL1, PEL2, PEL3 of the pixel electrode PE1 does not overlap with the spacer member SP1, each of the line portions PEL1, PEL2, PEL3 of the pixel electrode PE1 does not require being connected at a portion other than the connecting portion PEJ1. Therefore, as shown in FIG. 11, the line portion PEL1, the line portion PEL2, and the line portion PEL3 of the pixel electrode PE1 is separated from one another at the portion other than the connecting portion PEJ1.

Capacitance of the capacitor Cst described with reference to FIG. 3 becomes large in proportion to an area of the pixel electrode PE (see FIG. 7). When the signal pulse has a low frequency, flicker countermeasures may be taken by increasing the capacitance of the capacitor Cst. Meanwhile, when the signal pulse has a high frequency, a condition of the signal pulse becomes strict due to the increase in the capacitance of the capacitor Cst. A frequency of the signal pulse tends to be high and, from the viewpoint of relaxing the conditions of the signal pulse, it is preferable that the area of the pixel electrode PE is small. In the case of the present embodiment, the pixel electrode PE1 that does not overlap with the spacer member SP1 is not provided with the connecting portion PEJ2 or/and the connecting portion PEJ3, so that the area of the pixel electrode PE1 can be minimized.

Further, in the example shown in FIG. 11, the spacer member SP1 does not overlap with the line portion PEL3 of the pixel electrode PE2. Consequently, the line portion PEL2 and the line portion PEL3 of the pixel electrode PE2 is separated from one another at a portion other than the connecting portion PEJ1. Furthermore, the spacer member SP1 does not overlap with the line portion PEL1 of the pixel electrode PE3. The line portion PEL1 and the line portion PEL2 of the pixel electrode PE3 are separated from each other at a portion other than the connecting portion PEJ1. In other words, the example shown in FIG. 11 has a configuration in which: the line portion that overlaps with the spacer member SP1 is provided with the connecting portion; and the line portion that does not overlap with the spacer member SP1 is not connected to the line portion. Consequently, the pixel electrode PE1, the pixel electrode PE2, and the pixel electrode PE3 have different shapes from one another. This makes it possible to minimize the area of each of the pixel electrodes PE1, PE2, PE3.

First Modification Example

Figure 12:
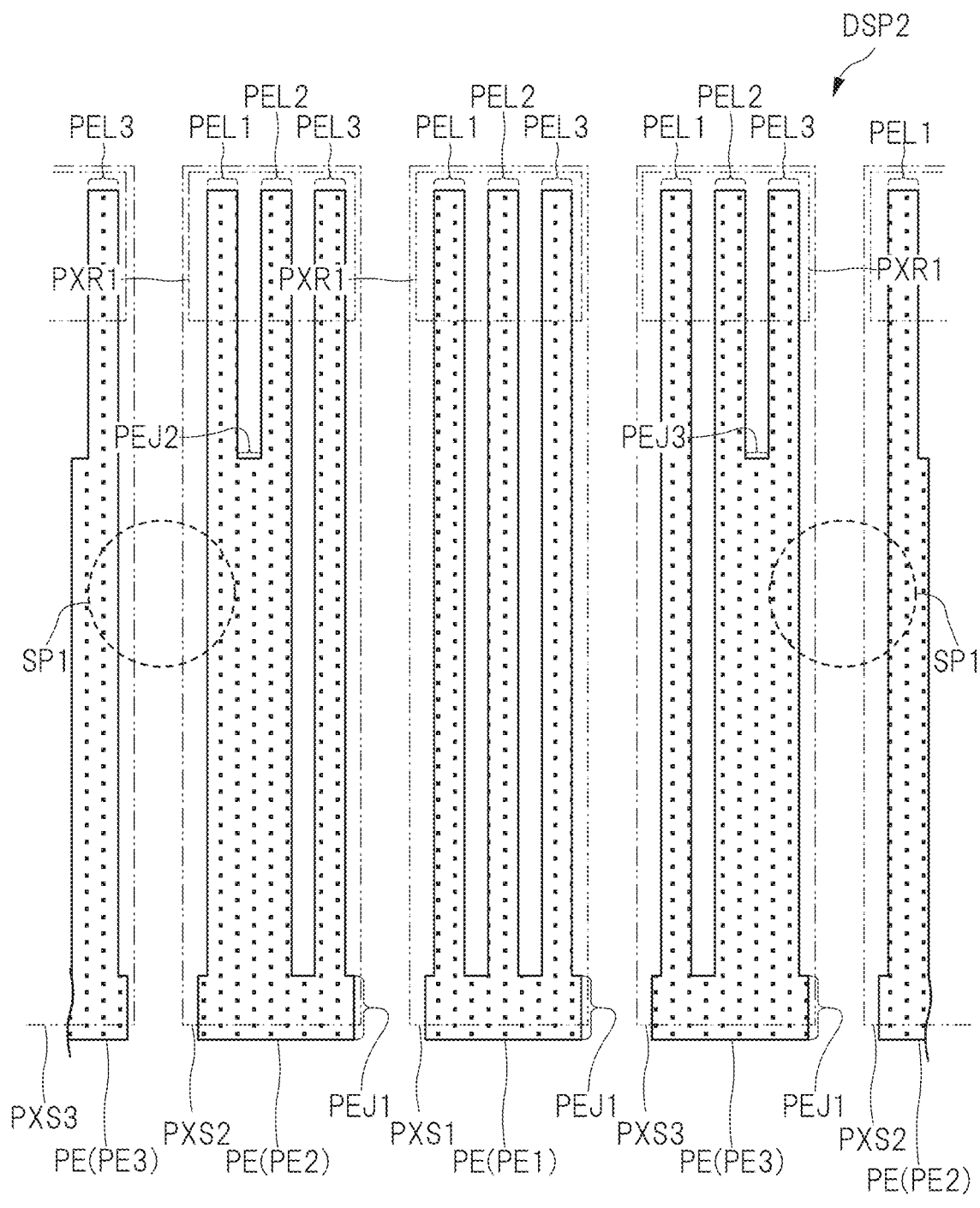
FIG. 12 is an enlarged plan view showing a modification example of FIG. 11.

FIG. 12 is an enlarged plan view showing a modification example of FIG. 11. In a case of a display device DSP2 shown in FIG. 12, the connecting portion PEJ2 is integrally formed with the connecting portion PEJ1. Similarly, the connecting portion PEJ3 is integrally formed with the connecting portion PEJ1. In a case of this modification example, each width of the line portion PEL1 of the pixel electrode PE2 and the line portion PEL3 of the pixel electrode PE3 is widened at a portion overlapping with the spacer member SP1. This makes it possible to improve a strength of the line portion PEL (see FIG. 7) at the portion overlapping with the spacer member SP1.

Meanwhile, in the case of the display device DSP1 shown in FIG. 11, the connecting portion PEJ2 is separated from the connecting portion PEJ1. Similarly, the connecting portion PEJ3 is separated from the connecting portion PEJ1. As described above, the display device DSP1 shown in FIG. 11 is preferable from the viewpoint of reducing the capacitance of the capacitor Cst shown in FIG. 3 by reducing the areas of the pixel electrodes PE2, PE3.

Incidentally, in FIG. 12, described has been the embodiment in which the connecting portion PEJ2 of the pixel electrode PE2 is integrally formed with the connecting portion PEJ1 and the connecting portion PEJ3 of the pixel electrode PE3 is integrally formed with the connecting portion PEJ1. However, the first modification example may have a configuration in which: the example shown in FIG. 11 and the example shown in FIG. 12 are combined; and the connecting portion PEJ2 (or the connecting portion PEJ3) of any one of the pixel electrode PE2 and the pixel electrode PE3 is integrated with the connecting portion PEJ1. Since the display device DSP2 shown in FIG. 12 is the same as the display device DSP1 described with reference to FIGS. 1 to 11 except for the above-mentioned differences, an overlapping description will be omitted.

Second Modification Example

Figure 13:
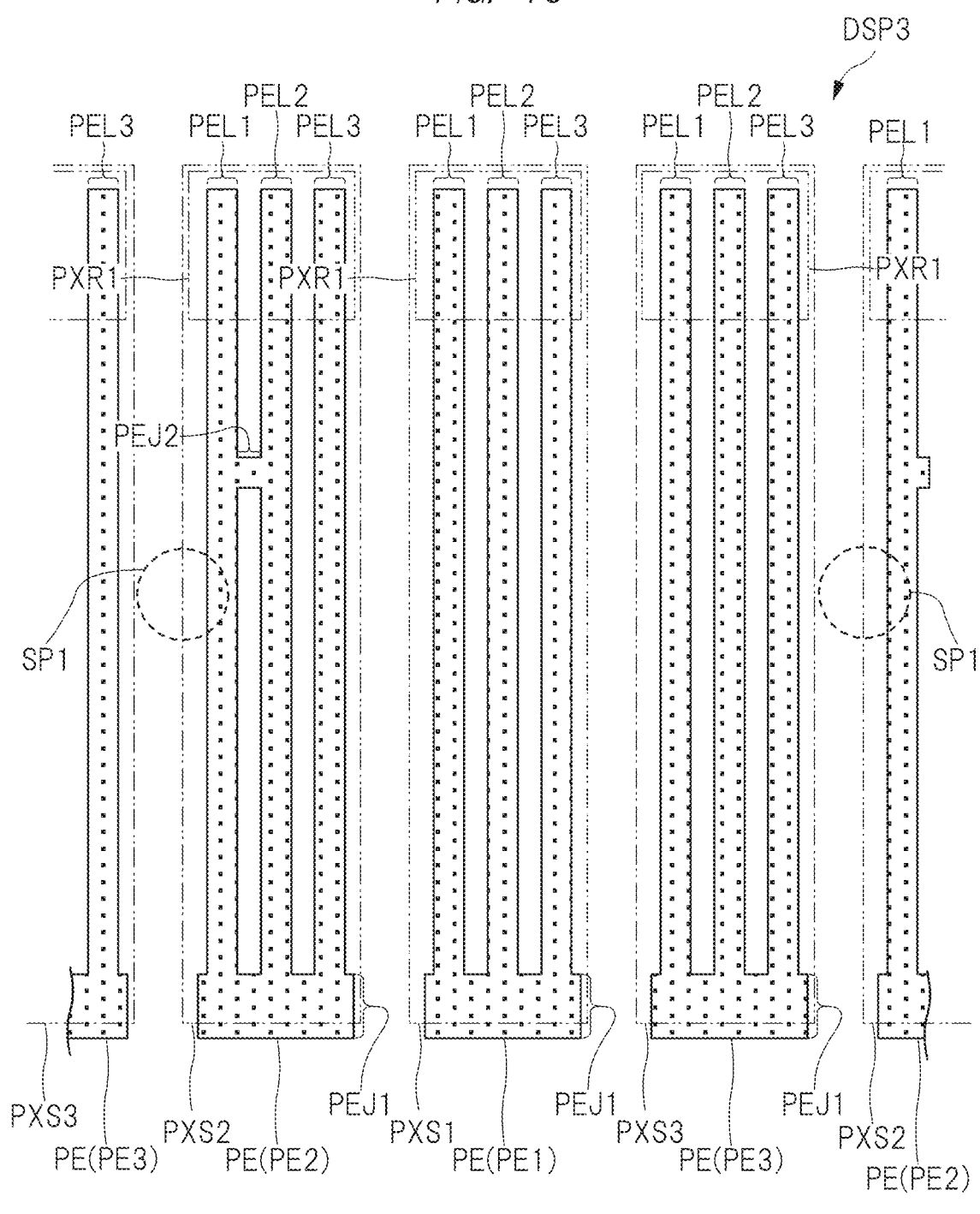
FIG. 13 is an enlarged plan view showing another modification example of FIG. 11.

FIG. 13 is an enlarged plan view showing another modification example of FIG. 11. A display device DSP3 shown in FIG. 13 differs from the display device DSP1 shown in FIG. 11 in the following points. In FIG. 11, described has been the embodiment in which one spacer member SP1 is arranged across the pixel electrodes PE2, PE3. However, there are various modification examples in the plane size of the spacer member SP1. Consequently, when the plane size of the spacer member SP1 is small like the display device DSP3 shown in FIG. 13, the spacer member SP1 may overlap with the pixel electrode PE2 and may not overlap with the pixel electrode PE3. Therefore, the pixel electrode PE2 is provided with the connecting portion PEJ2, and the connecting portion PEJ3 shown in FIG. 11 is not formed on the pixel electrode PE3. Since the display device DSP3 shown in FIG. 13 is the same as the display device DSP1 described with reference to FIGS. 1 to 11 except for the above-mentioned differences, an overlapping description will be omitted.

Figure 14:
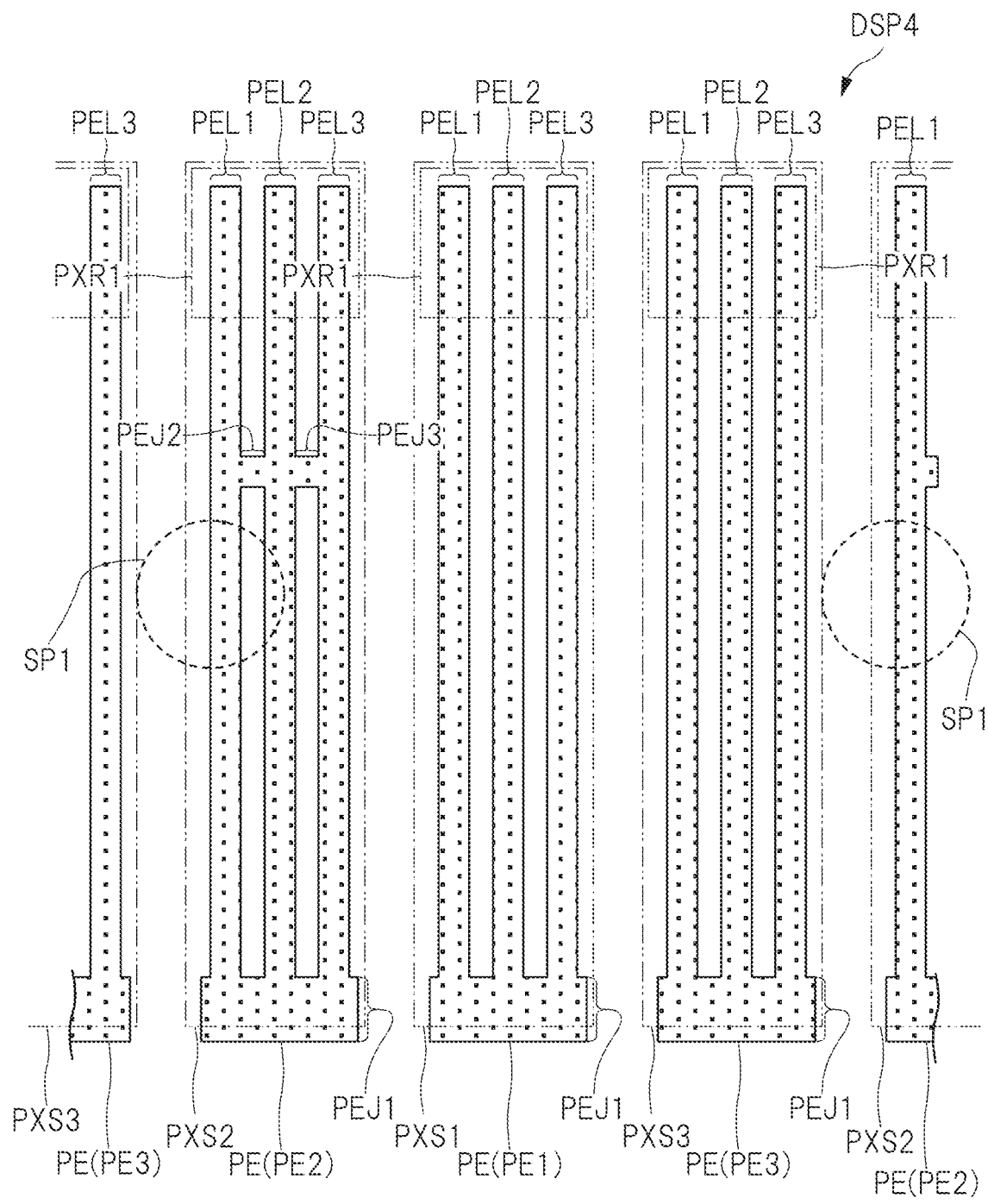
FIG. 14 is an enlarged plan view showing a modification example of FIG. 13.

FIG. 14 is an enlarged plan view showing a modification example of FIG. 13. A display device DSP4 shown in FIG. 14 differs from the display device DSP3 shown in FIG. 13 in the following points. In a case of the display device DSP4, the plane size of the spacer member SP1 is almost the same as the example of the display device DSP shown in FIG. 11. However, the spacer member SP1, which the display device DSP4 has, is closer to a pixel electrode PE2 side so as not to overlap with the pixel electrode PE3. In an example shown in FIG. 14, the spacer member SP1 overlaps with the line portions PEL1, PEL2 of the pixel electrode PE2. In this case, when an external force is applied to the spacer member SP1, each of the line portions PEL1, PEL2 of the pixel electrode PE2 may be damaged. Thus, this modification example has a configuration in which the driving of the liquid crystal is stabilized even when each of the line portions PEL1, PEL2 of the pixel electrode PE2 is damaged at the position overlapping with the spacer member SP1.

That is, the pixel electrode PE2 further has a connecting portion (third connecting portion) PEJ3 that connect the line portion PEL3 and the line portion PEL2 arranged next to the line portion PEL3 in addition co the connecting portion PEJ2 that connects the line portion PEJ1 and the line portion PEL2 arranged next to the line portion PEL1. The connecting portion PEJ2 of the pixel electrode PE2 is arranged between a region where the line portion PEL2 of the pixel electrode PE1 overlaps with the spacer member SP1 and one end portion of the line portion PEL2 of the pixel electrode PE2 (an end portion opposite to the connecting portion PEJ1). The connecting portion PEJ3 of the pixel electrode PE2 is arranged between a region where the line portion PEL3 of the pixel electrode PE1 overlaps with the spacer member SP1 and the one end portion of the line portion PEL3 of the pixel electrode PE2 (an end portion opposite to the connecting portion PEJ1). Consequently, even when each of the line portions PEL1, PEL2 of the pixel electrode PE2 is damaged at a position overlapping with the spacer member SP1, a signal is applied to each of the line portions PEL1, PEL2, PEL3 that overlap with the visible light transmission region PER1 of the pixel electrode PE2. As a result, the driving of the liquid crystal can be stabilized. Since the display device DSP4 shown in FIG. 14 is the same as the display device DSP3 shown in FIG. 13 except for the above-mentioned differences, an overlapping description will be omitted.

Incidentally, although not shown, another modification example may have a configuration in which the plane size of the spacer member SP1 is further larger than the example shown in FIG. 11. In this case, the spacer member SP1 may overlap with the line portions PEL3, PEL2 of the pixel electrode PE3 in addition to the line portions PEL1, PEL2 of the pixel electrode PE2. In this case, if each of the pixel electrodes PE2, PE3 shown in FIG. 11 has a structure of the pixel electrode PE2 shown in FIG. 14, the driving of the liquid crystal can be stabilized.

Third Modification Example

Figure 15:
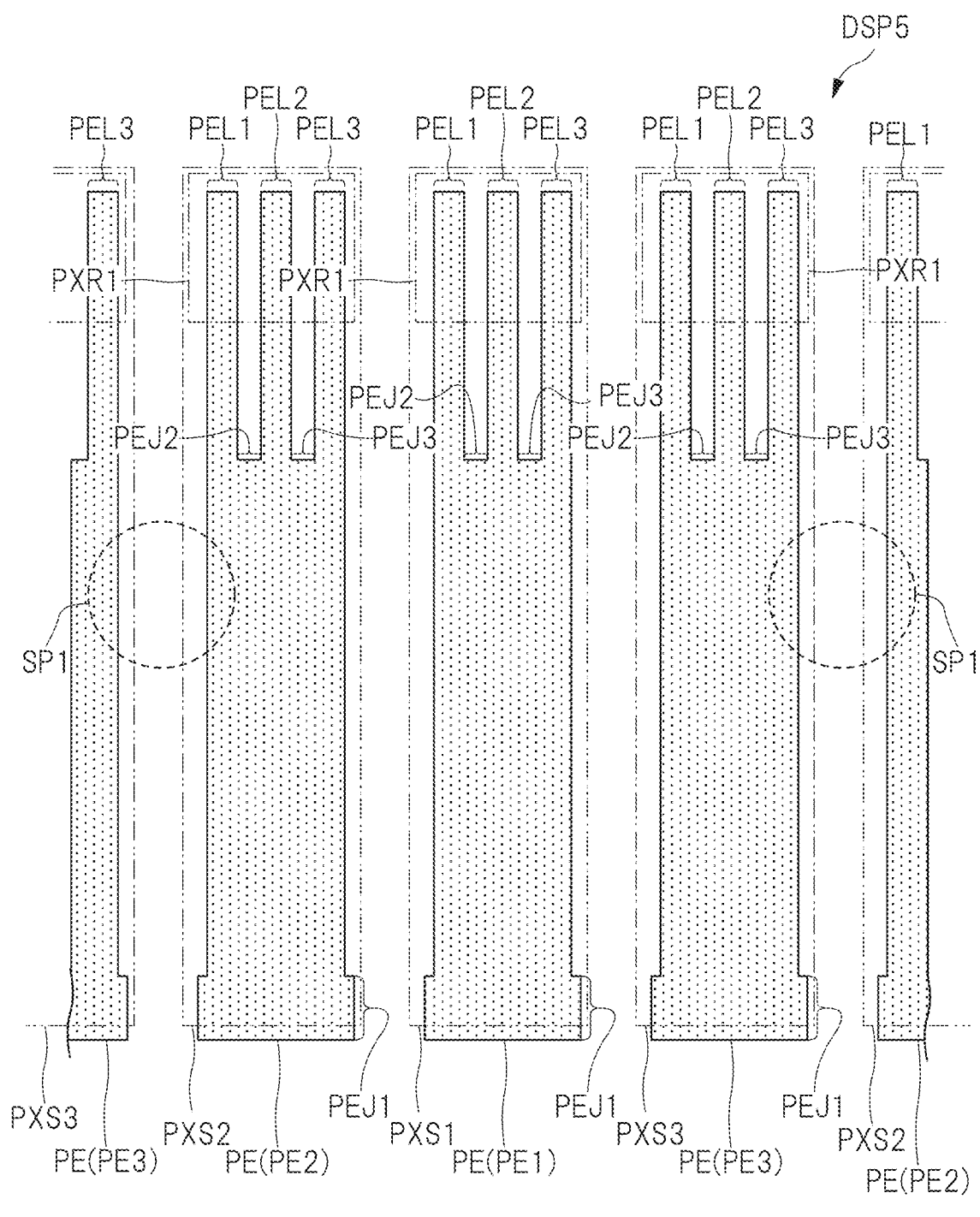
FIG. 15 is an enlarged plan view showing yet another modification example of FIG. 11.

FIG. 15 is an enlarged plan view showing another modification example of FIG. 11. A display device DSP 5 shown in FIG. 15 differs from the display device DSP 1 shown in FIG. 11 in the following points. As explained briefly above, when the pulse signal applied to the pixel electrode PE is a low frequency signal, charge retention time is longer than that of the high frequency signal, so that a phenomenon called a flicker which is recognized as screen flickering may occur. As such a countermeasure, it is preferable to increase the capacity of the capacitor Cst shown in FIG. 3.

Each of the pixel electrodes PE1, PE2, PE3, which the display device DSP5 shown in FIG. 15 has, has a connecting portion PEJ2 that connects the line portions PEL1, PEL2, and a connecting portion PEJ3 that connects the line portion PEL3 and the line portion PEL2, similarly to the pixel electrode PE2 described with reference to FIG. 14. Further, each of the connecting portions PEJ2, PEJ3 is formed integrally with the connecting portion PEJ1. In a case of the display device DSP5, controlling the areas of the connecting portions PEJ2, PEJ3 makes it possible to improve mechanical strengths of the pixel electrodes PE2, PE3 and control the capacity of the capacitor Cst shown in FIG. 3.

In a case of this modification example, from the viewpoint of increasing the capacitance, it is preferable that the pixel electrode PE1 which does not overlap with the spacer member SP1 also has the same shape as those of the pixel electrode PE2 and the pixel electrode PE3. Since the display device DSP5 shown in FIG. 15 as the same as the display device DSP1 shown in FIG. 11 except for the above-mentioned differences, an overlapping description will be omitted.

Within the scope of an idea(s) of the present invention, those skilled in the art can arrive at various modification examples and variation examples, and it is understood that these modification examples and variation examples also belong to the scope of the present invention. For example, a component(s) appropriately added, deleted, or design-changed for each of the above-described embodiments by a person skilled in the art, or a step(s) added, omitted, or condition-changed by a person skilled in the art is also included within a scope of the present invention as long as it has the gist of the present invention.

INDUSTRIAL APPLICABILITY

The present invention is available in a display device.

What is claimed is:
1. A display device comprising:
a first substrate;
a second substrate opposing the first substrate;
a liquid crystal layer arranged between the first substrate and the second substrate;
an optical sensor arranged between the first substrate and the liquid crystal layer;
a plurality of pixels composed of a first sub-pixel, a second sub-pixel arranged next to one end of the first sub-substrate in a first direction, a third sub-pixel arranged next to the other end of the first sub-pixel in the first direction;
a plurality of pixel electrodes arranged between the liquid crystal layer and the first substrate;
a first light-shielding film formed between the liquid crystal layer and the second substrate and formed in a matrix so as to partition each of the first sub-pixel, the second sub-pixel, and the third sub-pixel; and
a first spacer member arranged between the first substrate and the second substrate and mainlining a thickness of the liquid crystal layer,
wherein each of the first sub-pixel, the second sub-pixel, and the third sub-pixel includes:
a visible light transmitting region that transmits visible light via a display opening formed in the first light-shielding film; and
a light-shielding region arranged next to the visible light transmitting region in a second direction intersecting with the first direction, and covered with the first light-shielding film,
each of the plurality of pixel electrodes includes:
a first line portion, a second line portion, and a third portion that extend in the second direction and are arranged so as to separate from one another at one end portions thereof; and
a first connecting portion formed so as to connect the respective other end portions of the first line portion, the second line portion, and the third line portion,
the plurality of pixel electrodes includes a first pixel electrode arranged on the first sub-pixel, a second pixel electrode arranged on the second sub-pixel, and a third pixel electrode arranged on the third sub-pixel,
the spacer member is arranged at a position overlapping with the first line portion of the second pixel electrode in a plan view, the second pixel electrode further has a second connecting portion that connects the first line portion and a second line portion arranged next to the first line portion, and the second connecting portion of the second pixel electrode is arranged between a region where the first line portion of the second pixel electrode overlaps with the first spacer member and the one end portion of the first line portion of the second pixel electrode.

2. The display device according to claim 1, wherein the first spacer member is arranged at a position overlapping with each of the first line portion of the second pixel electrode and the third line portion of the third pixel electrode in a plan view, the third pixel electrode further has a third connecting portion that connects the first line portion and a second line portion arranged next to the third line portion, and the third connecting portion of the third pixel electrode is arranged between a region where the third line portion of the pixel electrode arranged in the first sub-pixel overlaps with the first spacer member and the one end portion of the third line portion of the third pixel electrode.

3. The display device according so claim 1, wherein the first spacer member does not overlap with the first pixel electrode, and the first, second, and third line portions of the first pixel electrode are separated from one another at a portion other than the first connecting portion.

4. The display device according to claim 3, wherein the first, second, and third pixel electrodes have mutually different shapes.

5. The display device according to claim 1, wherein the optical sensor is arranged in the first sub-pixel.

6. The display device according to claim 2, wherein the optical sensor is arranged in the first sub-pixel.

7. The display device according so claim 1, wherein the second connecting portion is separated from the first connecting portion.

8. The display device according to claim 2, wherein the first spacer member does not overlap with the first pixel electrode, and the first, second, and third line portions of the first pixel electrode are separated from one another at a portion other than the first connecting portion.

9. The display device according to claim 8, wherein the first, second, and third pixel electrodes have mutually different shapes.

* * * * *